United States Patent [19]

Hayes et al.

[11] Patent Number: 5,150,467
[45] Date of Patent: Sep. 22, 1992

[54] METHOD AND APPARATUS FOR SUSPENDING AND RESTARTING A BUS CYCLE

[75] Inventors: Dennis F. Hayes; Gerald Stark, both Westford, Mass.

[73] Assignee: Digital Equipment Corporation, Maynard, Mass.

[21] Appl. No.: 740,867

[22] Filed: Jul. 31, 1991

Related U.S. Application Data

[63] Continuation of Ser. No. 496,097, Mar. 15, 1990, abandoned, which is a continuation of Ser. No. 93,188, Sep. 4, 1987, abandoned.

[51] Int. Cl.[5] ............................................. G06F 13/38
[52] U.S. Cl. ............................. 395/325; 364/DIG. 1; 364/240
[58] Field of Search ............... 395/200 MS, 275 MS, 395/325 MS, 425 MS, 725 MS

[56] References Cited

U.S. PATENT DOCUMENTS

| | | | |
|---|---|---|---|
| 4,050,097 | 9/1977 | Miu et al. | 364/200 |
| 4,120,029 | 10/1978 | Steiner | 364/200 |
| 4,236,203 | 11/1980 | Curley et al. | 364/200 |
| 4,257,095 | 3/1981 | Nadir | 364/200 |
| 4,348,722 | 9/1982 | Gunter et al. | 364/200 |
| 4,390,944 | 6/1983 | Quackenbush et al. | 314/200 |
| 4,503,495 | 3/1985 | Boudreau | 364/200 |
| 4,602,327 | 7/1986 | La Violette | 364/200 |
| 4,628,445 | 12/1986 | Buonomo et al. | 364/200 |

Primary Examiner—Kevin A. Kriess
Attorney, Agent, or Firm—Kenyon & Kenyon

[57] ABSTRACT

In a system which includes a processor which executes bus cycles on a bus and in which a signal is sent back to the processor indicative of completion of a bus cycle, completion of the cycle is suspended and then restarted by storing the address, deasserting control signals, isolating the processor from the bus, and delaying issuance of the signal indicative of completion of the bus cycle. Subsequently the cycle is restarted by connecting the processor to the bus, reissuing the address and control signals from a PAL and allowing the normal completion of the cycle.

16 Claims, 11 Drawing Sheets

FIG. 3

| HEX ADDRESS | |
|---|---|
| 2000 0000 | NODE 0 |
| 2000 2000 | NODE 1 |
| 2000 4000 | NODE 2 |
| 2000 6000 | NODE 3 |
| 2000 8000 | NODE 4 |
| 2000 A000 | NODE 5 |
| 2000 C000 | NODE 6 |
| 2000 E000 | NODE 7 |
| 2001 0000 | NODE 8 |
| 2001 2000 | NODE 9 |
| 2001 4000 | NODE 10 |
| 2001 6000 | NODE 11 |
| 2001 8000 | NODE 12 |
| 2001 A000 | NODE 13 |
| 2001 C000 | NODE 14 |
| 2001 E000 | NODE 15 |

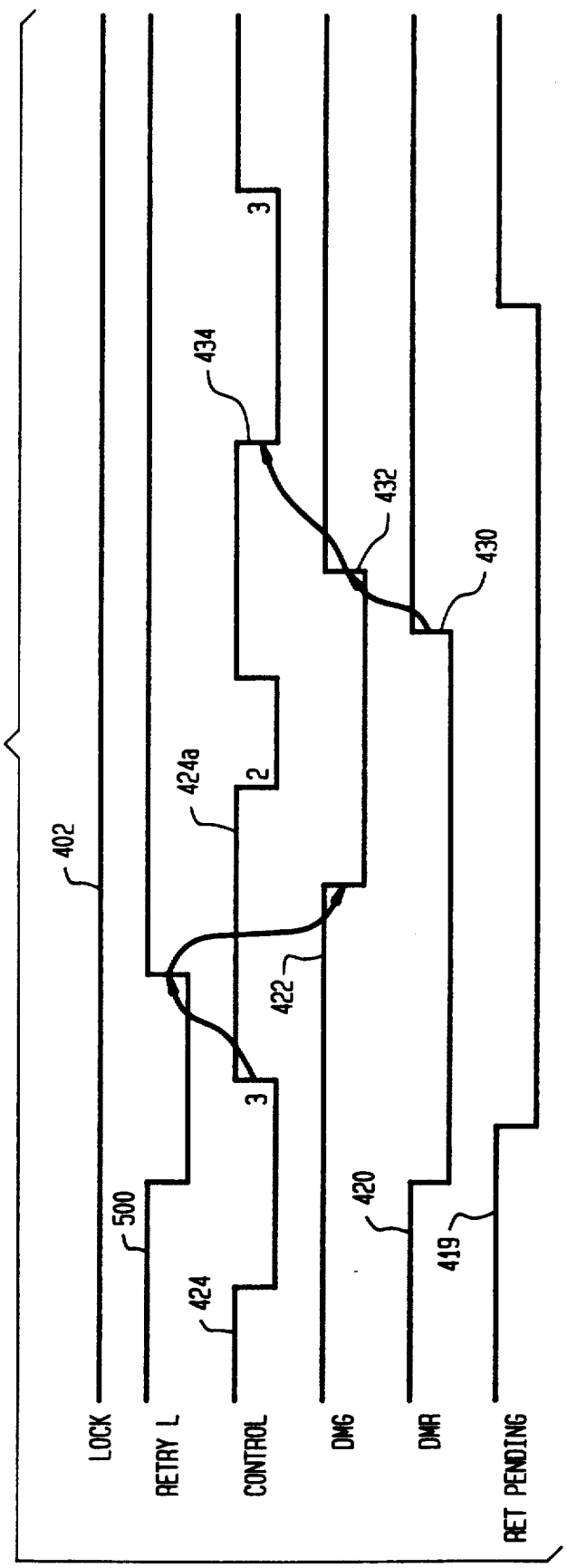

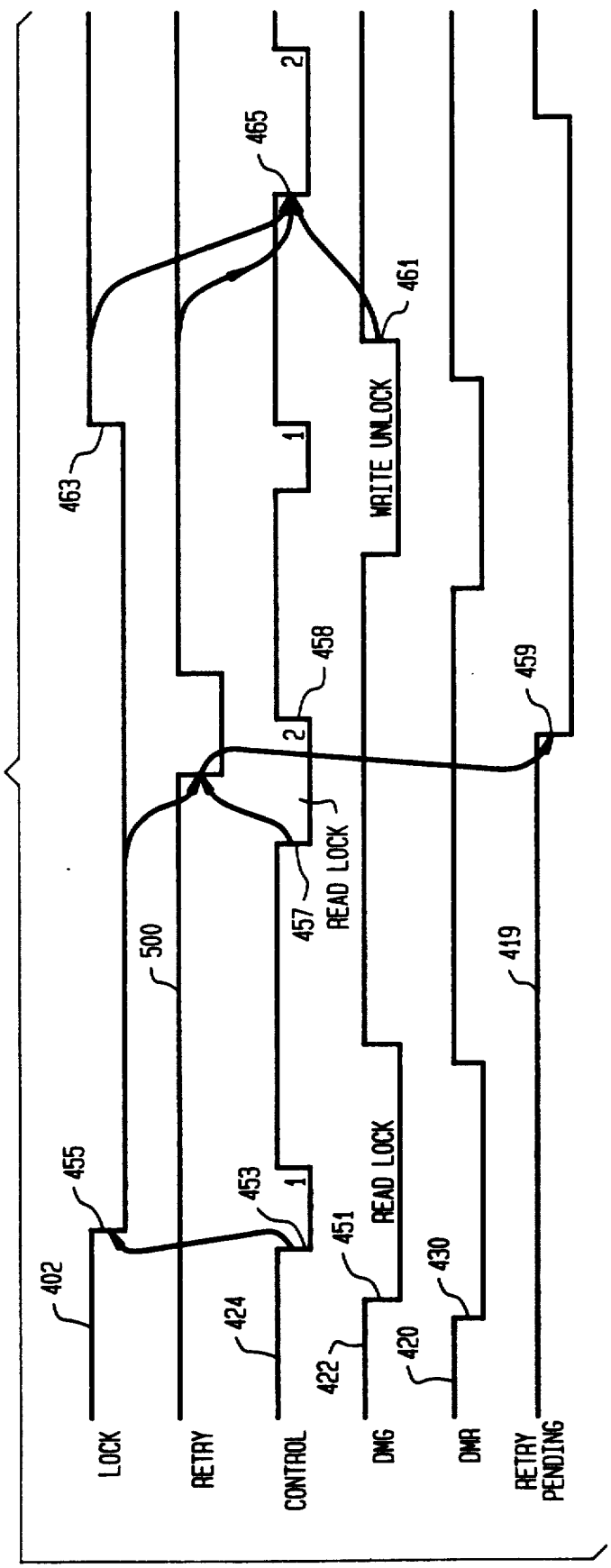

METHOD AND APPARATUS FOR SUSPENDING AND RESTARTING A BUS CYCLE

This application is a continuation of application Ser. No. 496,097, filed Mar. 15, 1990, which in turn is a continuation of Ser. No. 093,188, filed on Sep. 4, 1987, both now abandoned.

BACKGROUND OF THE INVENTION

A. Field of the Invention

This invention relates broadly to the field of digital computer systems. More particularly it relates to a method and apparatus for suspending a bus cycle of a processor and then restarting the cycle.

B. Prior Art

In all digital computing systems, the central processing unit (processor) is perhaps the most crucial element for determining the total system capacity and versatility. Generally, as digital computing has progressed, central processing units have become increasingly fast and capable of operating upon increasing amounts of data.

The development of more capable processors has encouraged digital computer designers to connect more and more input/output devices to the central processing unit. Also, increasing amounts of memory are also connected to the processor. Usually, these peripheral devices are connected to the processor along a bi-directional communication circuit called the system bus. The bus is capable of carrying data to and from the processor, the memory and the input/output devices. In a relatively recent development, additional processors may be connected to the bus.

This multiplicity of interconnected devices creates several problems. The first is that the operating speeds of the various LSI devices used to implement input/output devices vary greatly. For example, a serial port interface designed to operate with one vendor's microprocessor may be to slow to operate with another vendor's microprocessor. Some method needs to be found to allow a high speed implementation of a microprocessor with readily available low speed input/output devices.

Another is that more than one processor or input device may try to operate on a memory data structure at the same time. If data in a memory location is altered by a second processor or input/output device prior to the completion of a read/modify/write operation upon the location by the first processor, program synchronization will be lost and system operation severely degraded. Thus access to shared memory must be allocated and controlled in a systematic way between all input/output devices and the processors so as to avoid the overlap problem.

Although prior computing systems have used various methods in attempts to overcome these problems, they have not been completely successful. The methods currently used to prevent improper access to memory locations can result in the loss of processor operating time due to required initializations and established protocols. The various methods of allowing the input/output devices to communicate over the system bus also frequently result in losing available processing time. The same loss of processor time results from the methods used to interface relatively slow input/output devices with memory devices and the processors.

Copending patent application Ser. No. 534,720, filed Sep. 22, 1983, entitled "Retry Mechanism For Releasing Control Of A Communications Path In A Digital Computer System", now U.S. Pat. No. 5,021,038 assigned to the same assignee as the present invention, and the disclosure of which is hereby incorporated by reference, discloses a retry mechanism. In the system disclosed therein the possibility exists for a communications path interlock. In such instances where a communication path is interlocked and a processor attempts to use that path, what is called a RETRY response is asserted. Thus, in the disclosed system which describes a master-slave relationship, RETRY is asserted by a slave device which cannot immediately respond to a transaction. An example is a memory which has been locked by an interlock read command. As described in this copending application the then current master responds to a slave RETRY response by terminating the transaction. The disclosed system assumes that the processor is designed to accept the RETRY response and is able to act upon it. However, not every processor, particularly in the case of small microprocessors used on single board computers, is adapted to respond to a RETRY command. On the other hand, in a system where resources are shared it is a great benefit to have the ability to respond to a RETRY command by suspending the transaction then in process and picking it up again.

SUMMARY OF THE INVENTION

The present invention provides a way to implement a RETRY command in a system with a processor, particularly a microprocessor which itself does not respond to a RETRY command. This is accomplished by electronically isolating the processor and suspending its operation when RETRY is asserted, saving address information and when RETRY is no longer asserted providing said address information and a series of control signals which simulate the beginning of a cycle.

In the illustrated embodiment, the system of the present invention is implemented in conjunction with a single board computer including a microprocessor connected by a bus arrangement to a memory subsystem and/or to other devices such as central processing units which may be further connected to a memory subsystem. The single board computer also has another bus interface through which it may access I/O devices or other computer systems.

In the illustrated embodiment the mechanism for isolating the processor operates in three situations: 1) an incoming transaction transmitted by a another processor is contending with an outgoing instruction transmitted by the processor for use of the communications bus, 2) a time-of-year (TOY) clock is read from or written to (the clock has a slow setup and access time), and 3) the processor attempts a read operation on local memory when that memory is locked, the locking occurring when another device is accessing the memory, or the processor attempts a read operation on the memory of an interconnected processor which is locked.

In response to any one of these events, the various transceivers which allow the processor to output its bus control signals, data and address signals, and byte mask signals are deactivated. Thus, the processor is electronically isolated from the bus. The address output by the processor is stored in a RETRY address latch. Finally, error and ready signals, the receipt of which would indicate to the processor that a cycle had been completed and that it can begin a new cycle, are blocked.

After the potential deadlock and/or competition among the various devices has been resolved the processor transceivers are connected and the latched address is provided as an output. The signals of the initial portion of the suspended processor transaction are recreated. The processor, which was unaware of its isolation from the bus during the described operation, then continues in the normal way.

BRIEF DESCRIPTION OF THE DRAWINGS

FIG. 3 depicts the system bus node space assignments of the system of FIG. 1.

FIGS. 7, 7A and 7B are timing diagrams showing the RETRY sequence.

DETAILED DESCRIPTION

System Overview

Figure 1:
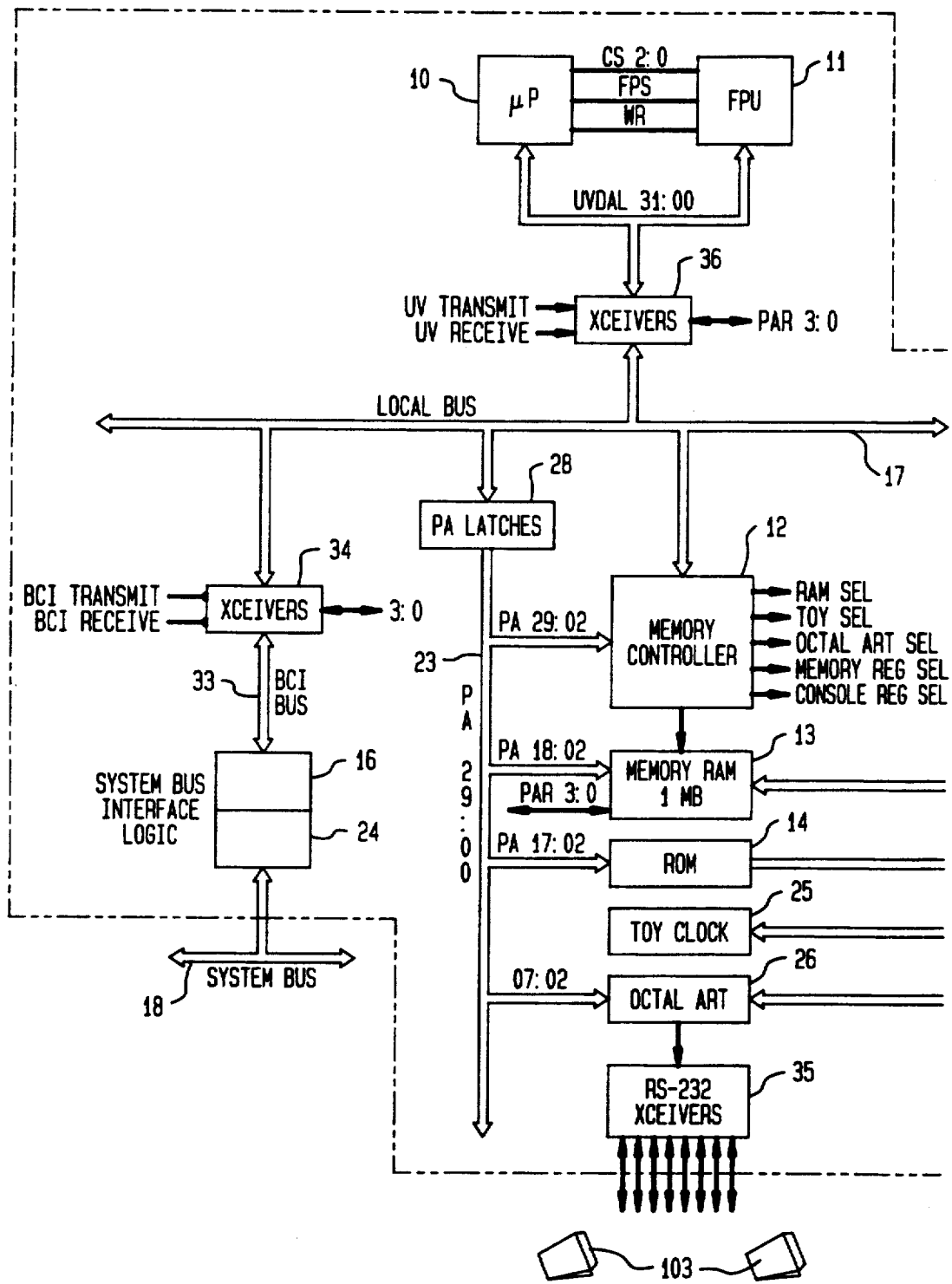
FIG. 1 is a block diagram of a computer system employing the present invention.
Figure 1:
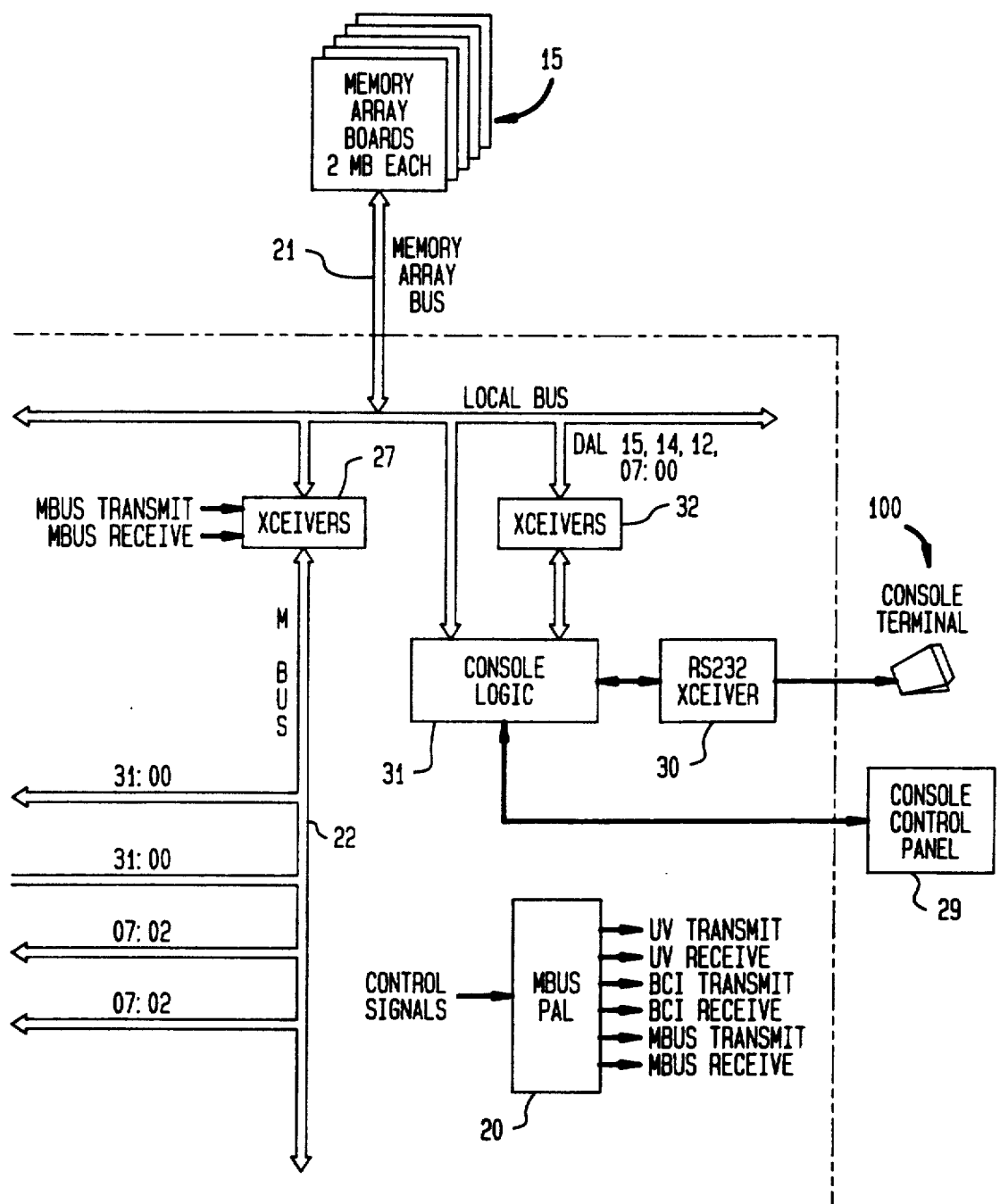

Referring now to the drawings and initially to FIG. 1, illustrated in block diagram form, is a system configuration according to the present invention. The system includes a single chip microprocessor 10, a floating point coprocessor 11, a memory controller 12, a local RAM 13, a local ROM 14, an off board memory 15, a time of year (TOY) clock 25, an Octal ART 26, a PAL 20, a system bus interface 16 and 24, latches 28 and transceivers 27, 32 and 34. The system components 10, 11, 12, 13, 14, 15, 16 are interfaced with one another by means of a bus 17. The system components 10, 11, 12, 13, 14, 15, 16, 17 are interfaced through the bus interface 16 to bus 18.

A preferred system configuration for advantageous implementation of the teachings of the invention comprises a single board computer module 9 which contains system components 10, 11, 12, 13, 14, 16, 24, 25, 26, 20, 24, 28, 27, 32, 34, 30, 31 and bus 17. The single board computer may be a module which is 32-bit, single-board processor that provides VAX functionality. The module is compatible with system bus 18 which is manufactured by Digital Equipment Corporation and hereinafter referred to as the system bus. The term "VAX" refers to a product line manufactured by Digital Equipment Corporation.

The module 9 may function either as a primary or a secondary CPU in a larger computer configuration. The module 9 thus serves as a computational engine for an operating system and for user application programs.

The module 9 implements console functions. A console 100 provides the user interface to the module 9 and to the system configuration in which it is used. Through console 100, a user can bootstrap the system image, invoke diagnostic routines, examine or write registers and memory throughout the system bus 18 configuration, and interactively communicate with the operating system and application programs.

In addition to a console interface, the module 9 provides an asynchronous serial interface 35 (RS-232C-compatible) for up to eight terminals 103. The terminals operate independently of the console subsystem.

The module 9 has extensive on-board diagnostics. On power-up or node reset, it tests itself and makes its status (pass or fail) available over the system bus 18. A set of LEDs on the printed circuit board of module 9 also indicates the outcome of self-test. In addition, a user can invoke other on-board diagnostics to test the logic and functions of module 9 more extensively.

The microprocessor chip 10 in the illustrated embodiment is a 32-bit, virtual-memory processor chip. Chip 10, for example, can directly address a 1 Gbyte physical address space.

The floating-point unit 11 (78132) is a single-chip, floating-point processor 11 that functions as a slave to the processor 10. The floating-point unit (FPU) performs 32-bit, floating-point computation and accelerates the execution of certian integer and character-string instructions.

The local bus 17 is a 32-bit, asynchronous, bidirectional bus that connects the processor 10 with on-board memory 13 and 14 and on-board devices. The local bus 17 is time-multiplexed so that address information and data are transmitted over the same lines during different cycles of transaction.

The local bus interface logic 19 connects the local bus 17 with the processor 10, the chip 16, and components on the memory bus 22 (MBUS). The processor 10 and chip 16 transceivers generate byte parity on writes and check byte parity on reads. The bus transceivers are controlled by the MBUS PAL 20.

The memory bus 22 (MBUS) connects local memory, as well as other devices, to the local bus 17. The MBUS 22 is a 32-bit- data bus that interfaces with the local bus 17 through transceivers 27. With the exception of the realtime clock chip 25, the MBUS devices are addressed over a physical address (PA) bus 23. During the address part of a local bus cycle, local bus address bits [29:0] are latched by the PA latches 28.

The module 9 has a 1 Mbyte of on-board RAM 13. Byte parity is generated for RAM writes, and it is checked on RAM reads. The RAM can be backed up by batteries.

The module 9 has 128 Kbytes of ROM 14 that store firmware to perform initialization routines, the primary bootstrap routine, console program code, diagnostic routines and in-circuit tester pattern-generating code. The module 9 can accommodate up to 256 Kbytes of ROM.

The memory controller 12 controls access to the physical address space. The memory controller 12 decodes the address on the PA bus 23, enables the appropriate device, and returns status information to the local bus master. The memory controller 12 also drives on-board RAM 13 and provides refresh timing for all local RAM, which includes off-board RAM on memory array modules 15.

Pursuant to the teachings of the present invention, on power-up or node reset, the primary processor in the system, which could be the module 9 itsealf, assigns the module 9 a starting address offset (SAO). The SAO represent the base address for local RAM within system physical memory space. The memory controller 12 uses the SAO to decode memory references. If the module 9 is not the primary processor, the console software assigns the starting address from the system Starting Address Register.

The memory array bus 21 is an off-board extension of the local bus 17. The memory array bus 21 connects the module 9 with daisy chained memory array boards 15 in accordance with the present invention. The memory array bus 21 thus allows the module 9 to access an extended main memory.

Each memory array board 15 contains 2 Mbytes of dynamic RAM implemented on 256 Kbyte-memory chips. Up to five memory array boards 15 can be daisy chained to module 9 by memory array bus 21.

Main memory can thus be expanded to a total of 11 Mbytes (1 Mbyte on-board plus 10 Mbyes on memory array boards 15).

Pursuant to the present invention, the local bus master recognizes there is no distinction between the on-board RAM 13 and memory array board 15. The access time and other operating characteristics are identical. Memory array board 15 can also be backed up by batteries.

The local bus 17 and the system bus 18 interface through interface chips 16 and 24. Chip 24 is a standard user interface to the system bus 18. The chip 16, which connects to the chip 24 through a bus 33, is a memory-mapped peripheral device of the processor 10.

The chip 16 is the window of module 9 onto the system bus 18. When the processor 10 references a non-local physical address, the chip 16 translates the local bus 17 transaction into a transaction on the system bus 18. When another system node addresses the module 9, the chip 16 translates the incoming system transaction into an local bus 17 transaction.

The chip 24 implements the system bus 18 commands and performs system error checking and arbitration.

The console 100 is the primary user interface to module 9 and to the system computer system as a whole. The console consists of an RS-232C interface 30, a control panel 29, and console firmware that implements console commands. A DLART (DIGITAL Link asynchronous receiver/transmitter) chip provides parallel-to-serial and serial-to-parallel conversion between the processor chip 10 and the RS-232C transceivers 30.

The console has two operating modes: program mode and console mode. In program mode, characters typed at the console terminal are passed to the operating system; this is the normal operating mode (run mode). In console mode, characters typed at the console terminal are interpreted as console commands; the operating system and all application programs are suspended.

The module 9 provides an asynchronous serial interface 35 (RS-232C compatible) for up to eight terminals 103. This interface is implemented in an octal ART 26 (octal asynchronous receiver/transmitter) chip. The octal ART 26 supplies eight independently programmed serial lines. One line (line 0) has modem-control signals that enable communication with a modem.

The module 9 provides a time-of-year (TOY) clock and a real-time clock. Both clock functions are implemented in the Motorola RTC chip 25 (MC146818). This chip 25 calculates and stores the time and date during system operation. The TOY clock 25 has 50 bytes of battery-backed up RAM used by the console firmware to store the state of processor 10 when console mode is entered. The real-time function permits programmable interrupts to the processor chip 10.

LOCAL BUS

The local (integrated circuit interconnect) bus 17 is a 32-bit, asynchronous, bidirectional bus. The local bus 17 interfaces the processor chip 10 with local memory and on-board logic and supports direct memory access (DMA) transfers to and from local memory and the system bus.

The local bus 17 is time-multiplexed. That is, address information and data are transmitted over the same lines during different parts of the bus cycle. Toward the beginning of the cycle, the address is transmitted. Toward the end of the cycle, data is transmitted.

Communication between any two devices on the local bus 17 takes place within a master/slave relationship. The bus master initiates and controls the transaction. The slave responds to the bus master's commands and returns appropriate status information. The local bus 17 is an interlocked bus in that only one transaction can be on the bus at any given time.

Data transfers on the local bus 17 occur on naturally-aligned longword (32-bit) boundaries. For example, memory fetches occur on address boundaries ending in 0, 4, 8 and C (hex). The bus master asserts the appropriate Byte Mask lines to indicate which bytes within a transferred longword contain valid data.

Figure 2:
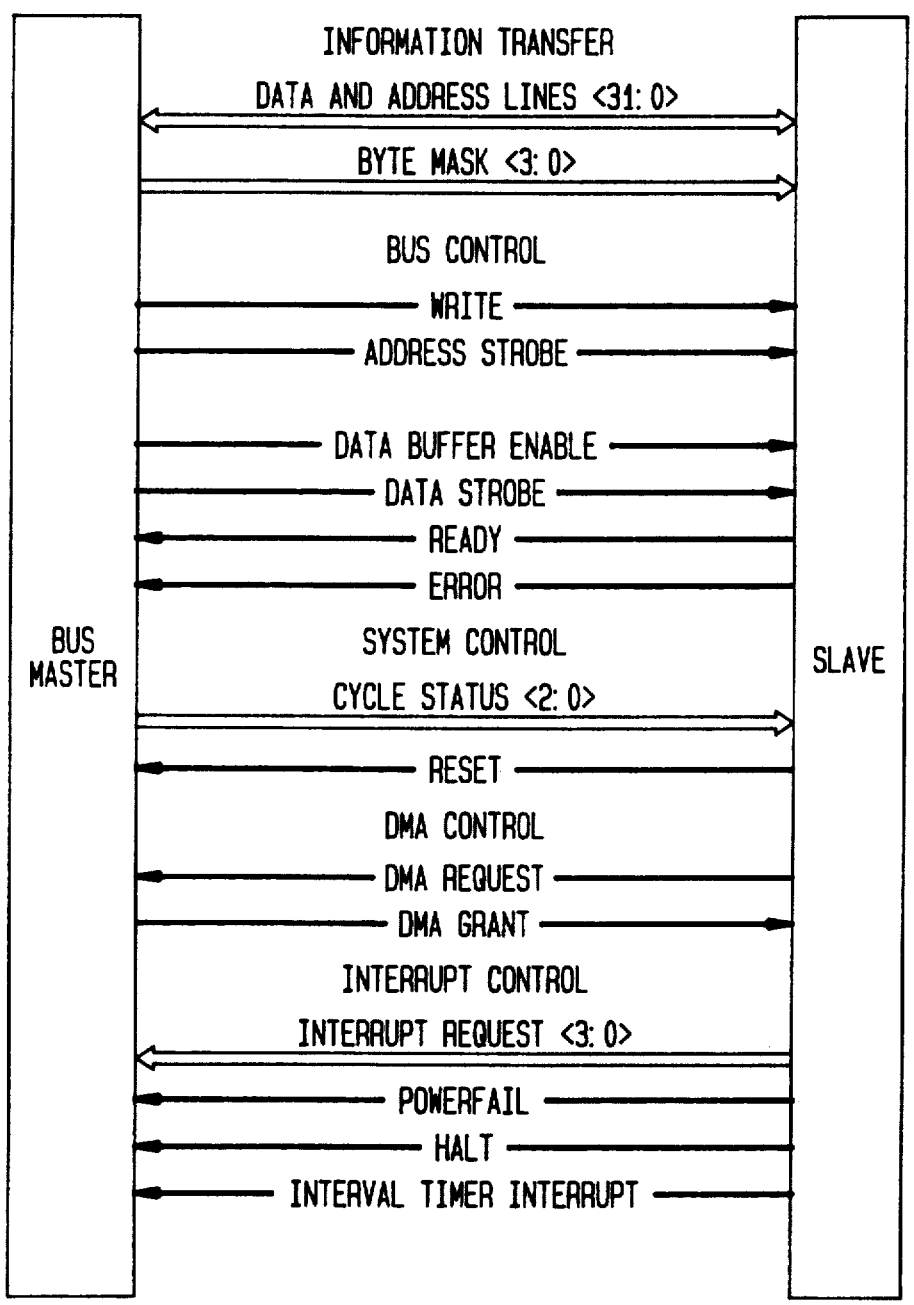
FIG. 2 is an illustration of the local bus structure of the system of FIG. 1.

The local bus's 17 data and control signals are divided into classes. FIG. 2 depicts the local bus 17 structure and also delineates the classes of signals. The first class is information transfer signals and that encompasses 32 data and address lines and 4 lines for byte mask information. The second class is bus control and it entails control signals such as write, address strobe, data buffer enable, data strobe, ready and error. The third class of signals is system control which is comprised of 3 lines of cycle status and reset. The fourth class of signals is DMA (direct memory access) control which contains DMA request and DMA grant. The last class of signals is interrupt control which is comprised of 4 lines for interrupt request, powerfail, halt and interval timer interrupt.

The data and address lines are 32 bidirectional lines that are time-multiplexed. Toward the beginning of a read or write cycle, DAL [31:0] provide address and control information via DAL [31:30] to indicate the length of data to be transferred as follows:

| [31] | [30] | Length of Data |
|------|------|----------------|
| 0 | 0 | Byte (8 bits) |
| 0 | 1 | Word (16 bits) |
| 1 | 0 | Longword (32 bits) |
| 1 | 1 | Quadword (64 bits) |

The processor chip 10 executes quadword transactions on the local bus 17 as two consecutive longword transactions and DAL [29:2] convey a physical longword address. Data is always transferred on naturally-aligned longword boundaries. Bit [29] distinguishes memory space from I/O space such that when DAL[29]=0, is a memory reference and when DAL[29]=1, it's an I/O reference.

DAL [1:0] are the byte address but may differ from the address implied by BM [3:0] during an instruction prefetch (always an aligned longword), during a character string data prefetch (always an aligned longword), during a PTE (page table entry) read (always an aligned longword) or during the second cycle of an unaligned operation.

Toward the end of a write cycle, DAL [31:0] transmit data from the bus master to the slave device. Toward the end of a read cycle, DAL [31:0] transmit data from the slave to the bus master.

DAL [31:0] are also used for interrupt acknowledge cycles, external processor cycles and external processor register cycles. For an Interrupt Acknowledge Cycle, toward the beginning of an interrupt acknowledge bus cycle, DAL [4:0] output the interrupt priority level (IPL) of the interrupt. Toward the end of the cycle, DAL [9:2] input the interrupt vector.

For an external processor register cycle, the processor chip 10 does not implement all the internal processor registers (IPRs) specified in the VAX architecture. These omitted IPRs are implemented externally and accessed through MTPR (Move to Processor Register) and MFPR (Move from Processor Register) commands. In the module 9 the console registers in the DLART chip are accessed as external processor registers. These bus cycles are similar to external processor cycles.

The Byte Mask signals specify which bytes on DAL [31:0] contain valid information during the data transfer part of a read or write cycle. When BM [3] is asserted, DAL [31:24] contain valid data. When BM [2] is asserted, DAL [23:16] contain valid data. When BM [1] is asserted, DAL [15:8] contain valid data and when BM [0] is asserted, DAL [7:0] contain valid data.

During a read cycle, the Byte Mask signals indicate which bytes the slave device must place on DAL [31:0]. The bus master ignores bytes that do not contain valid data. During a write cycle, the Byte Mask signals indicate which bytes on DAL [31:0] contain valid data. The slave device ignores the masked bytes. During unmasked reads and writes, and during interrupt acknowledge cycles, all four Byte Mask signals are asserted. The Byte Mask signals are valid only when the Address Strobe line (AS) is asserted.

The Write line specifies the direction of a data transfer on DAL [31:0]. If the bus master asserts WR, then it will drive data onto DAL [31:0]. If the bus master does not assert WR, then the slave device will drive data onto DAL [31:0]. WR is valid only when AS or EPS is asserted.

The Address Strobe line provides timing information for address transfers. The bus master asserts AS when the address on DAL [29:2] is valid during a read, write, or interrupt acknowledge cycle. The bus master deasserts AS at the end of the bus cycle.

The Data Buffer Enable line, in conjunction with WR, controls the DAL transceivers. The bus master asserts DBE to enable the transceivers and deasserts DBE to disable them.

The Data Strobe line provides timing information for data transfers. During a read cycle or an interrupt acknowledge cycle, the bus master asserts DS to indicate that it is ready to receive incoming data. The bus master then deasserts DS to indicate that it has received and latched the incoming data. During a write cycle, the bus master asserts DS to indicate that DAL [31:0] contain valid write data. The bus master then deasserts DS to indicate that it is about to remove the write data from DAL [31:0].

External logic asserts the Ready line to indicate the normal termination of a read, write, or interrupt acknowledge cycle. During a read cycle, this indicates that the slave device will place the required data on DAL [31:0]. During a write cycle, this indicates that the slave device has received data on DAL [31:0]. During an interrupt acknowledge cycle, this indicates that the interrupt vector has been placed on DAL [31:0]. When the bus master recognizes an asserted RDY, it terminates the current bus cycle. External logic then deasserts RDY.

External logic asserts the Error line to indicate the abnormal termination of a read, write, or interrupt acknowledge cycle. After receiving an asserted ERR, the bus master terminates the current bus cycle. External logic then deasserts ERR. On receiving an asserted ERR, the processor chip executes a machine check.

A response PAL 41 in the memory controller 12 asserts ERR whenever a parity error occurs on a read from local RAM 13, provided that parity error reporting is enabled.

The Cycle Status signals, in conjunction with WR, provide status about the current bus cycle. When AS is asserted during a read, write, or interrupt acknowledge cycle, CS [2:0] are encoded as shown below in Table 1.

TABLE 1

| WR | CS [1:0] 1 0 | Bus Cycle Type |
|---|---|---|
| H | L L | RESERVED |
| H | L H | Read data |
| H | H L | RESERVED |
| H | H H | Response enabled |
| L | L L | Write command (FPU) |
| L | L H | Write data |
| L | H L | Write command (non-FPU) |
| L | H H | RESERVED |

When system DC LO L is asserted, the RESET line is asserted, forcing logic on the local bus 17 to an initialized state. A reset aborts any local bus 17 transactions and/or chip internal operations in progress, and causes the module 9 to enter its initialized state.

External logic requests control of the local bus 17 by asserting the DMA Request (DMR) line. DMR must be asserted as long as external logic controls the bus. At the end of the DMA bus cycle, external logic deasserts DMR. In the module 9 the chip 16 is the only device that uses the local bus 17 for DMA transfers.

The processor chip 10 asserts the DMA Grant (DMG) line to give external logic control of the local bus 17. The processor 10 asserts DMG as long as external logic has control of the bus and deasserts DMG after external logic has deasserted DMR. In the module 9, the chip 16 is the only device that requests and is granted control of the local bus 17. DMG is also asserted during retry cycles.

The Interrupt Request signals are the device interrupts to the processor chip 10. External logic asserts IRQ[3:0] to post interrupt requests.

Each IRQ line has a unique interrupt priority level (IPL). The processor 10 accepts an interrupt request only if the request's IPL is higher than the IPL at which the processor 10 is currently operating. Each interrupt line also corresponds to a unique IPL on the system bus. An incoming system interrupt is translated by the chip into a corresponding local bus device interrupt.

The IPL assignments for IRQ [3:0] are: IRQ [3] is IPL 17 (hex); IRQ [2] is IPL 16 (hex); IRQ [1] is IPL 15 (hex); and IRQ [0] is IPL 14 (hex). IRQ [3:0] are level-sensitive signals that the processor chip 10 samples every cycle (200 ns). The processor 10 sychronizes an IRQ signal internally. When the processor 10 accepts an interrupt request, it completes the current macroinstruction and then executes an interrupt acknowledge bus cycle. During this cycle, the processor 10 acknowledges the IPL at which the IRQ is posted and then inputs the vector for the interrupt. In the module 9, the chip 16 inputs the acknowledged IPL and outputs the appropriate interrupt vector on DAL [9:2].

On the assertion of system AC LO L, indicating that the line voltage is below specification, the powerfail interrupt (BCI AC LO) is asserted to the processor 10. This interrupt vectors program control to a powerfail routine. When the module 9 asserts system DC LO L, indicating DC system voltages are about to fall below specification, the RESET line is asserted. RESET initializes the processor 10 and other logic on the local bus 17.

When the module 9 is in program mode and the key switch is enabled, pressing the BREAK key on the console terminal keyboard asserts HALT to the processor 10, forcing the module 9 to enter console mode. After halting, the processor 10 executes an external processor write cycle. During this cycle, Cycle Status [1:0] = 10 and DAL [5:0] = 111111. The module 9 ignores this bus cycle.

HALT is a nonmaskable interrupt. HALT always interrupts the processor chip 10 after the current macroinstruction completes, regardless of the processor's 10 current IPL. HALT is an edge-triggered signal that is sampled every cycle (200 ns).

The interval counter overflows every 10 milliseconds, thereby generating an interval timer interrupt (INTTIM) to the processor 10 at IPL 16.

The interval counter is controlled by the Interval Clock Control Register (ICCR), an IPR in the processor 10. The counter is enabled when bit [6] in the ICCR is set and disabled when bit [6] is clear.

The module 9 supports different local bus 17 cycle types. The types include idle, read, write, interrupt acknowledge, DMA and retry.

During an idle cycle, DAL [31:0] are asserted but are undefined, and the bus control signals are deasserted. An idle cycle lasts four clock phases (nominally 200 ns).

In a CPU read cycle, the bus master inputs data from memory or an on-board I/O device. A CPU read cycle lasts at least eight clock phases (nominally 400 ns) and may last longer in increments of four clock phases (nominally 200 ns).

For a CPU read cycle, the bus master drives a physical longword address onto DAL [29:2]. The bus master asserts BM [3:0] as required and deasserts WR. The bus master asserts AS, indicating that the address is valid, and then asserts DS, indicating that DAL [31:0] are free to receive incoming data. If no error occurs, the slave device drives the required data onto DAL [31:0], and external logic asserts RDY. If an error occurs, external logic asserts ERR, which aborts the bus cycle. This causes the processor 10 to execute a machine check. Finally, the bus master deasserts AS and DS to end the cycle.

In a CPU write cycle, the bus master outputs data to memory or an on-board I/O device. A CPU write cycle lasts at least eight clock phases (nominally 400 ns) and may last longer in increments of four clock phases (nominally 200 ns).

For a CPU write cycle, the bus master drives a physical longword address onto DAL [29:2]. The bus master asserts BM [3:0] as required and asserts WR. The bus master asserts AS, indicating that the address is valid. The bus master then drives data onto DAL [31:0] and asserts DS, indicating that the data is valid on DAL [31:0]. If no error occurs, the slave device reads the data, and the external logic asserts RDY. If an error occurs, external logic asserts ERR, which aborts the bus cycle. This causes the processor 10 to execute a machine check. Finally, the bus master deasserts AS and DS to end the cycle.

In an interrupt acknowledge cycle, the processor chip 10 acknowledges a posted interrupt and inputs an interrupt vector. An interrupt acknowledge cycle lasts at least eight clock phases (nominally 400 ns) and may last longer in increments of four clock phases (nominally 200 ns). The detailed timing of an interrupt acknowledge cycle is identical to that of a CPU read cycle.

At the beginning of the cycle, the processor 10 outputs on DAL [4:0] the IPL of the interrupt being acknowledged. The processor 10 then asserts AS to indicate that DAL [4:0] contain a valid IPL. The chip 16 reads the IPL from the bus. The processor 10 then asserts DS to indicate that DAL [9:2] are free to receive the interrupt vector. The chip outputs the appropriate interrupt vector on DAL [9:2]. If an error occurs, external logic asserts ERR, which causes the processor 10 to ignore the data and abort the transaction. Finally, the processor chip 10 deasserts AS and DS to end the interrupt acknowledge bus cycle.

The processor 10 initiates the cycle by driving the cycle status onto CS [1:0], precharging and sustaining CS [2] high, and asserting EPS. The external processor responds by placing the required information on DAL [31:0]. The processor 10 reads the information on DAL [31:0] and deasserts EPS. The external processor then removes the information from DAL [31:0] to end the cycle.

In an external processor write/command cycle, the processor chip 10 outputs either a command or data to an external processor. The cycle lasts four clock phases (nominally 200 ns).

In a DMA cycle, the processor chip 10 relinquishes control of the local bus 17 to an on-board DMA device. The cycle begins when a DMA device (the chip) asserts DMR to request control of the bus. At the conclusion of the current bus cycle, the processor 10 tristates DAL [31:0], AS, DS, WR, and DBE; drives high and tristates BM [3:0] and CS [2:0], and asserts DMG. The DMA device may now use the bus to transfer data. On completion of the transfer, the DMA device stops driving AS, DBE, and DS and deasserts DMR. The processor 10 then deasserts DMG and begins the next bus cycle.

If a transaction request is not granted, the processor chip 10 retries the transaction. The local bus 17 address is stored in the chip chip.

The local bus 17 supplies eight hardware interrupts to the processor 10. Four of these interrupts are external and four are internal. External interrupts allow on-board devices to interrupt the processor 10. Internal interrupts alert the processor 10 to impending power failures, console halt requests, and interval timer overflows.

The Interrupt Request lines, IRQ[3:0], are the four external interrupts. IRQ [3:0] are assigned IPLs 17 through 14 (hex), respectively. The higher the IPL, the higher the interrupt priority. The processor 10 responds to an interrupt request when the request's IPL is higher than the IPL at which the processor 10 is currently operating.

The processor 10 responds to an external interrupt after completing the current macorinstruction by executing an interrupt acknowledge bus cycle. During this cycle, the processor 10 outputs the IPL of the interrupt on DAL [4:0], and then inputs the interrupt vector from the requesting device on DAL [9:2]. In the module 9, the chip inputs the IPL and outputs the appropriate vector for all interrupt acknowledge cycles.

The three external events generate internal interrupts to the processor 10 are (1) pressing the BREAK key on the console terminal keyboard (if the halt-on-BREAK function is enabled), (2) a power failure and (3) an interval counter overflow. The following sections describe these events. Internal interrupts do not cause the processor 10 to execute an interrupt acknowledge bus cycle. Instead, program control is vectored to a routine appropriate to the type of internal interrupt.

When the module 9 is in program mode, pressing the BREAK key on the console terminal keyboard asserts HALT to the module 9, forcing the module 9 to enter console mode after completing the current macroinstruction. The halt-on-BREAK function can be disabled by setting the front panel key switch to the Secure position.

When the input line voltage goes below specification, the module 9 system control unit in the system asserts system AC LO L, which generates a powerfail interrupt to the processor 10 at IPL 1E. This interrupt vectors the processor 10 to a powerfail routine.

The interval counter overflows every 10 milliseconds, thereby generating an interval timer interrupt (INTTIM) to the processor 10 at IPL 16.

Interval timer interrupts are controlled by the Interval Clock Control Register (ICCR), an IPR in the processor 10. Setting bit [6] in the ICCR enables the interrupts. Clearing this bit disables the interrupts.

On-board peripheral devices request and are granted control of the local bus 17 through DMA Request (DMR) and DMA Grant (DMG), respectively. The chip uses DMAs to transfer data between the local memory 13 and the system bus 18.

The Error line on the local bus 17 alerts the bus master to an error condition during the current bus cycle. The memory controller 12 asserts ERR whenever a parity error occurs on a read from local RAM 13, provided that parity is enabled. This causes the processor 10 to perform a machine check.

The local bus 17 carries a 28-bit physical address on DAL[29:2] that can reference 1 Gbyte physical address space. The local bus address space is equally divided into I/O space and memory space. For I/O references, address bit [29] is cleared. All on-board peripheral devices and ROM 14 reside in local bus 17 I/O space. Local RAM 13 resides in local bus memory space.

SYSTEM BUS INTERFACE

The module 9 communicates with other system bus 18 nodes by interfacing the local bus 17 to the system bus 18. This interface lets the module 9 access I/O controllers, bus adapters, system memory modules, and other system processors.

Most of the logic that provides this interface to the system bus 18 is implemented by the chip 24 (bus interconnect interface chip), and the chip 16 (interface chip). Additional interface logic is provided by the node ID buffers and the Console Display/Control Register (CDCR).

On one side, the chip 24 connects directly to the system bus 18. On the other side of the chip 24 is the BCI bus, which is the standard user interface to the system bus 18. In fact, from the perspective of the module 9, the chip 24 appears to be the system bus. The BII chip also implements the system protocol and error checking.

The chip 16 chip interfaces the local bus 17 to the BCI bus 33. The BCI bus 33 is the user side of the chip 24 chip. The chip 16 is thus the window on the system bus 18. The processor 10 sees the chip 16 as a memory-mapped peripheral device.

Whenever the module 9 processor issues a read or write to non-local memory space, a response PAL 41 (see FIG. 4) asserts system REFERENCE to the chip 16. The chip 16, aided by the chip 24, then translates the local bus 17 transaction into a system transaction.

Whenever the module 9 processor issues a read or write to non-local I/O space, the chip 16 automatically translates the transaction onto the system bus 18. The chip 16 reports the status of windowed transactions back to the processor 10.

In addition, the chip 16, aided by the chip 24, translates incoming system transactions into local bus 17 transactions. When the local bus 17 transaction completes, the chip 16 reports the transaction's completion status and, if appropriate, returns data to the originating system node.

If contention arises between an incoming system transaction and an outgoing local bus 17 transaction, the chip 16 asserts RETRY to a retry PAL 40 (see FIG. 4) in the memory controller 12. The retry PAL 40 then suspends the outgoing local bus 17 transaction until the incoming system transaction completes. The chip 16 stores the address for all local bus 17 transactions in its Retry Address Latch. When a suspended local bus 17 transaction is retried, the memory controller 12 fetches the stored local bus 17 address from the chip 16.

The chip 16 provides an interrupt controller for the processor chip 10. When the processor chip 10 acknowledges an interrupt from any source, the chip 16 inputs the acknowledged IPL (interrupt priority level) and supplies the processor 10 with the appropriate interrupt vector. In addition, the chip 16 translates system interrupts targeted at the module 9 processor into corresponding local bus 17 interrupts to the processor 10.

The chip 16 provides 14 general purpose registers in the node space. GPR 0, the Receive Console Data (RXCD) Register, is the console interface to the system bus 18. GPR 5, the Permanent Power-Up Diagnostic Register, stores a copy of the system self-test results. GPRs 7 through 11 are used by the console entry sequence. GPR 11, the Console Status Register, contains status on initialization. The rest of the chip 16 GPRs are not used.

The chip 16 implements two functions that the processor 10 does not use during normal operation but that may be useful for diagnostic purposes and special operations. The processor 10 can construct commands for the system bus 18 by writing certain chip 16 registers. The chip 16 also contains a special data mover that can move data over the system bus in octal word packets.

The Console Display/Control Register (CDCR) provides direct reads of several control lines on the system bus 18. The CDCR can also be written by the processor chip 10 to assert system RESET L and system BAD L on the system bus 18.

The system node identification number of module 9 is determined by four signal pins on the system backplane. This node ID number is independent of the slot location of module 9 in the system card cage. On power-up or reset, the node ID is loaded into the system Control and Status Register of the chip 24. The node ID determines which 8 Kbyte block in system nodespace is assigned to the module 9. This block contains the addresses of the system accessible registers. Blocks of nodespace are allocated according to the mapping scheme shown in FIG. 3.

The system bus 18 registers, which have addresses in system nodespace, are accessible to other system nodes. System access to the local RAM is determined by the Starting Address and Ending Address Registers in the chip 24. These registers are loaded on power-up or reset by the primary processor in the system (which could be the module 9 itself). During normal operation, all of the local RAM 13 is accessible over the system bus 18.

Table 2 (shown below) describes the implementation of the system commands by module 9. Since the processor 10 does not have cache memory, it does not issue read or write commands with the intention of caching data.

TABLE 2

| | Issues | Responds To |
|---|---|---|
| Single-Responder Commands | | |
| READ | Yes | Yes |
| RCI (Read with Cache Intent) | No | Yes |
| IRCI (Interlock Read with Cache Intent) | Yes | Yes |
| WRITE | Yes | Yes |
| WCI (Write with Cache Intent) | No | Yes |
| WMCI (Write Mask with Cache Intent) | Yes | Yes |
| UWMCI (Unlock Write Mask with Cache Intent) | Yes | Yes |
| IDENT (Identify) | Yes | Yes |
| MULTI-RESPONDER COMMANDS | | |
| INTR (Interrupt) | Yes | Yes |
| IPINTR (Interprocessor Interrupt) | Yes | Yes |
| BDCST (Broadcast) | No | Yes |
| STOP | Yes | No |
| INVAL (Invalidate) | Yes | No |

When the references a nonlocal memory address, the memory controller 12 asserts system REFERENCE to the chip 16. The chip 16 then translates (windows) the local bus 17 transaction into a system transaction. Normally, the local bus 17 is unavailable for other transactions until the windowed system transaction completes. However, if the chip 16 receives an incoming system bus 18 transaction, it takes control of the local bus 17 to service the transaction and then restarts the interrupted local bus 17 transaction. If the system transaction completes successfully, the chip 16 asserts the Ready line. Otherwise, the chip 16 interrupts the processor 10 or, for serious errors, asserts the Error line.

Table 3 (shown below) lists the translated local bus 17 transactions and their system counterparts. Table 4 (shown below) indicates the conditions on the system bus 18 that cause the chip 16 to assert the Error line to the processor 10.

TABLE 3

| Local bus Transaction | System bus Transaction |
|---|---|
| Read | READ |
| Write | WRITE |
| Read Lock | IRCI (Interlock Read with Cache Intent) |
| Write Unlock | UWMCI (Unlock Write Mask with Cache Intent) |
| Interrupt Acknowledge | IDENT (Identify) |

*Longword transactions.

TABLE 4

Read Transactions
A System bus retry timeout occurs.
A stall timeout occurs.
NO ACK is returned from the slave node.
A System bus error occurs (for example, bad parity is detected on the System bus or an illegal confirmation code is returned).
A Read Data Substitute code or Reserved read status code is returned from the slave node.
Write Transactions
A system bus retry timeout occurs.
A stall timeout occurs.
NO ACK is returned from the slave node.
A System bus error occurs (for example, bad parity is detected on the System bus or an illegal confirmation code is returned).

When the module 9 processor 10 is addressed over the system bus 18, the chip 16 asserts the DMA Request line (DMR) to the processor 10 to request mastership of the local bus 17. When granted bus mastership, the chip 16 translates the incoming system transaction into a local bus 17 transaction. The system bus 18 is interlocked during translated local bus 17 reads but not during translated local bus 17 writes. When the local bus 17 transaction completes, the chip 16 reports the completion status and, if appropriate, transfers data to the originating system node.

Table 5 (shown below) lists the system transactions to which the module 9 responds and their local bus 17 translations. Table 6 (shown below) indicates how the chip 16 translates local bus 17 status onto the system bus 18. Quadword and octaword transactions on the system bus 18 are translated into a series of longword transaction on the local bus 17.

TABLE 5

| System bus Transaction | Local bus Transaction |
|---|---|
| READ | Read |
| RCI (Read with Cache Intent) | Read |
| IRCI (Interlock Read with Cache Intent) | Interlock Read |
| WRITE | Write |
| WCI (Write with Cache Intent) | Write |
| WMCI (Write Mask with Cache Intent) | Write |
| UWMCI (Unlock Write Mask with Cache Intent) | Unlock Write Mask |
| IDENT (Identify) | Interrupt Acknowledge |

*Longword transactions.

TABLE 6

| Local Bus | Signal from Memory Controller to BCI3 Chip | BCI3's Response on System bus |
|---|---|---|
| Transaction completed successfully | READY | ACK |
| Interlock read attempted to locked memory | RETRY | RETRY |
| References to nonexistent address (an address not in local physical address space) | ERROR | NO ACK |
| Parity error on read from local RAM | ERROR | NO ACK |

The module 9 module accepts both Interrupt (INTR) commands and Interprocessor Interrupt (IPINTR) commands from the system bus 18.

On receiving an INTR command, the chip 16 asserts the corresponding local bus 17 Interrupt Request (IRQ) line. System IPLs BR 7-4 correspond to local bus 17 interrupts IRQ [3:0], respectively. The processor chip 10 responds to the interrupt request by executing an interrupt acknowledge transaction, which the chip 16 windows onto the system bus 18 as an IDENT transaction. The chip 16 inputs the vector from the interrupting node and returns this vector to the processor chip 10.

On receiving an IPINTR, the chip 16 asserts IRQ [14] to the processor chip 10. When the processor chip 10 acknowledges the interrupt request, the chip 16 returns 80 (hex), the vector for all IPINTRs.

MEMORY OVERVIEW

The module 9 supports both local memory 13 (on-board dynamic RAM), expansion memory (off-board RAM) on memory array boards 15, which are daisy chained, and 128 Kbytes or 256 Kbytes of on-board ROM 14. The module 9 does not have cache memory.

In one embodiment, the module 9 has one Mbyte of on-board RAM 13, which is composed of 256 Kbyte dynamic RAM chips. The local bus 17 master (processor 10 or chip 16) can access this memory only on naturally-aligned longword boundaries. However, the bus master can use the Byte Mask signals to specify which bytes in a transferred longword contain valid data.

On-board RAM 13 is parity protected. Byte parity is written to RAM on all writes and checked on all reads. Parity generation and checking is performed by the processor transceivers (for processor-initiated transactions) and by the chip 16 transceivers (for chip 16-initiated transactions). Parity is generated and checked only for bytes specified to be valid by the Byte Mask signals.

The memory access time depends on the local bus 17 master. An processor 10 initiated read cycle takes 400 ns, while a chip 16 initiated read cycle takes 50 to 100 ns longer, due to the synchronization requirements of chip 16. Write cycles are the same for both bus masters.

The system of the present invention can support a plurality of memory array boards 15 daisy chained to the memory array bus 21, as will appear. In the illustrated embodiments, because of physical constraints there is room for only five boards. Also in this embodiment each memory array board 15 contains two Mbytes of RAM. Each board is driven by its own on-board logic and by bus control signals.

To the local bus 17 master, there is no distinction between on-board RAM and off-board RAM. Off-board RAM supports byte parity, masked reads and writes, and has the same access times as does on-board RAM.

Because of the daisy chaining, memory array boards 15 must be placed in slots adjacent to the board 9. There can be no intervening slots or boards between the memory array boards 15 and the board 9.

The main memory and the memory controller 12 support longword read, read interlock, longword write, masked longword write and unlock write mask memory cycle types. All memory bus cycles are on naturally-aligned longword boundaries.

A longword read is a simple read from memory. The read interlock bus cycle locks all of main memory so that another read interlock cannot access memory until the lock is cleared. However, noninterlocked types of read operations can still access memory. A read interlock sets the Memory Locked bit in the memory controller 12.

A longword write is a simple write to memory. In the masked longword write, certain bytes within the referenced longword may be masked out. The Byte Mask signals indicate which bytes are valid. The unlock write mask clears the lock on main memory set by a previous interlock read. An unlock write mask clears the Memory Locked bit in the memory controller 12.

On power-up or node reset, the initialization code sizes the local RAM 13 and makes the size available in chip 24 GPR 1. The module 9 then assigns a starting address offset (SAO) to the local RAM 13. The SAO is the base address of the local RAM 13 in system memory space. If the module 9 is a secondary processor, the SAO value is based upon the contents found in the chip 24 Starting Address Register (SADR).

The module 9 contains independent power connections for battery-backup voltages. When provided, battery backup maintains the local RAM 13 and refresh circuitry. Battery-backup voltage is monitored by the system control unit.

The standard 128 Kbyte ROM provides 32K longword locations at addresses 2004 0000 hex through 2004 5FFF hex. The optional 256 Kbyte ROM provides 64K longword locations at addresses 2004 0000 hex, through 2004 7FFF hex. Both ROM configurations are accessed on naturally-aligned longword boundaries.

The 128 Kbyte ROM 14 configuration has a 15-bit address (PA [16:2]). The 256 Kbyte ROM configuration uses the same 15 address bits plus the signal 256 Kbyte ROM as the 16th (high-order) address bit. When 128 Kbyte ROM 14 is present, the signal 256 Kbyte ROM is allowed to float, that is, the bit is not connected to the ROM chips and therefore can be neither high nor low. When the 256 Kbyte ROM is present, however, the signal 256 Kbyte ROM must be connected to the ROM chips by adding a jumper to the module. The jumper connects ROM address 17 coming from the processor physical address latch with the 256 Kbyte ROM signal.

The standard 128 Kbyte ROM 14 provides 32K longword locations, but the total ROM space can accommodate 64K longwords. To completely fill the available boot ROM space, the 32K body of ROM code is replicated twice throughout this range of addresses.

Corresponding addresses from each set map to the same longword. This complete coverage of ROM space eliminates errors resulting from referencing nonexistent (unimplemented) locations. If a nonexistent location is referenced, the data returned is undefined.

The standard ROM configuration 14 contains the initialization routines, the primary bootstrap routine (VMB), diagnostic routines, and the console program, which are written in macrocode.

On power-up or node reset, program control jumps to the first location, 2004 0000 hex, in boot ROM space, and the module 9 executes its initialization routine. Note that the initialization code resides in the I/O space at addresses 2004 0000 hex, through 2008 0000 hex.

The primary bootstrap's main function is to locate the secondary bootstrap routine, bring it into memory, and then transfer control to it. The secondary bootstrap then loads the operating system.

The primary bootstrap also performs the following initialization in which it, tests all of local memory and builds a bit map that flags physical memory pages (512 Kbytes each) as good or bad, finds out what devices are present and operative in the system, and sets up the restart parameter block (RPB), a data structure used by powerfail and recovery routines to save volatile processor state.

VMB contains a boot driver that loads the secondary bootstrap program into memory and also writes a dump file to disk if the operating system detects a fatal error.

The diagnostic code consists of a self-test, which runs automatically on power-up and reset, and additional diagnostics, which can be invoked from a console. The self-test provides a quick confidence check of the hardware at the node, including any attached memory array boards 15. The additional diagnostics test the module 9 module more extensively. The diagnostic code also contains a parser that parses diagnostic commands.

The memory controller 12 controls access to the on-board memory, registers, and devices, as well as access to off-board memory that resides on attached memory array boards 15. Whenever the processor 10 or chip 16 chip references the physical address space, the memory controller 12 decodes the physical address and the local bus 17 cycle type, and provides completion status to the local bus 17 master. In addition the memory controller 12 controls the addressing of on-board RAM 13, refresh timing for both on-board and off-board RAM 15, parity error reporting and local bus retry timing.

Figure 4:
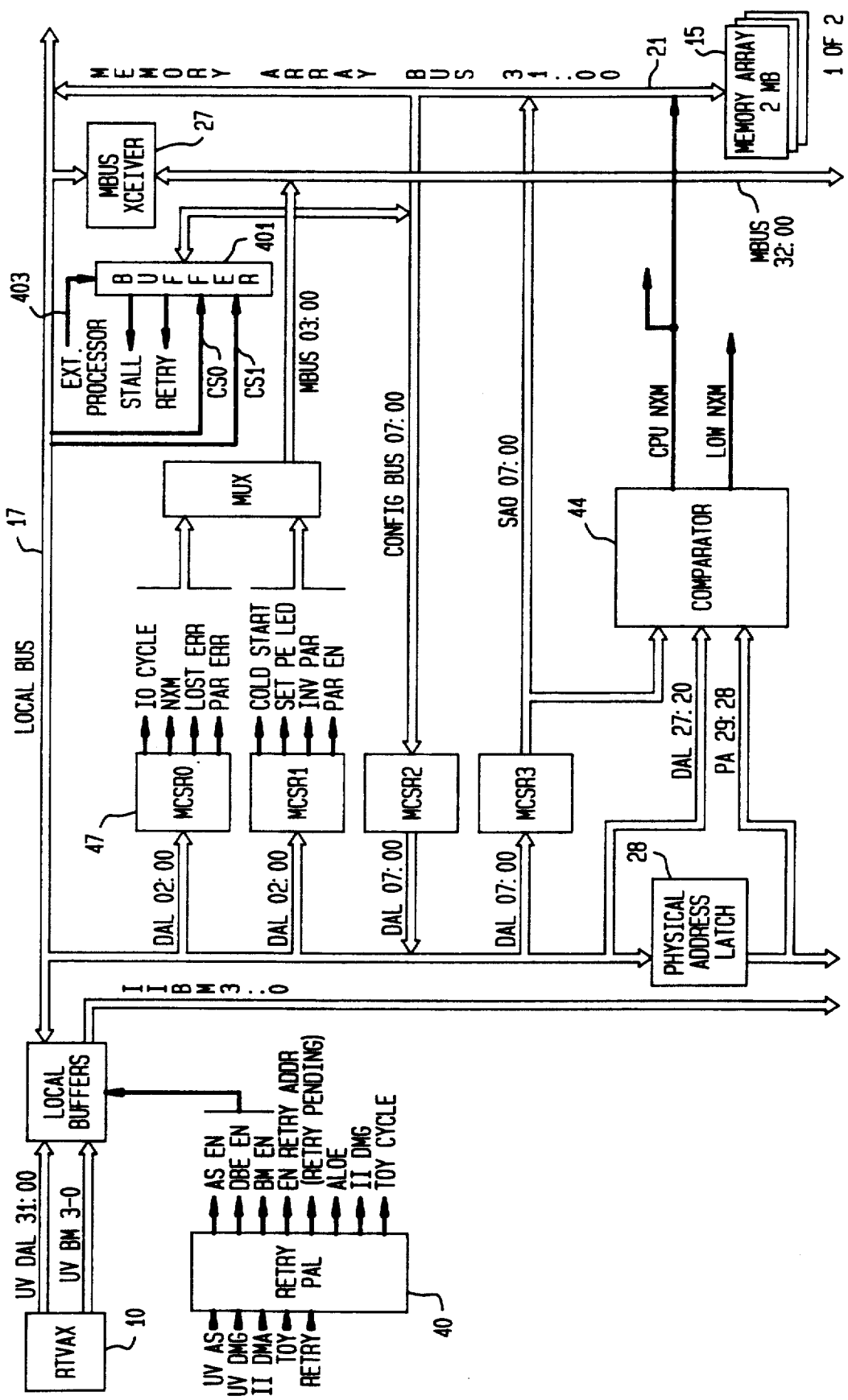
FIG. 4 is a block diagram of a memory controller contained in the memory system of the system of FIG. 1.
Figure 4:
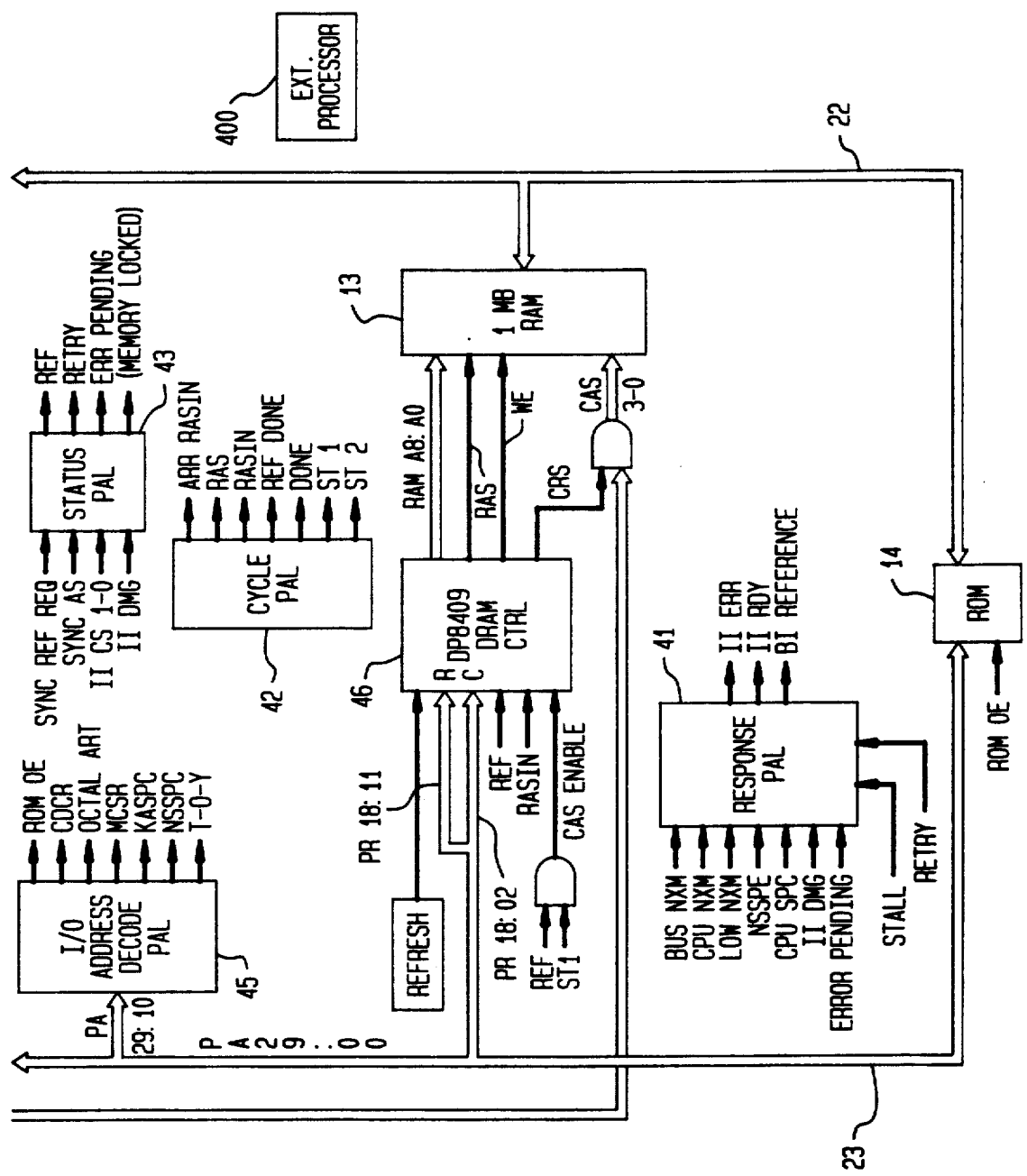

Refer to FIG. 4 is a block diagram showing the major components of the memory controller 12. These include I/O address PAL 45, memory address comparator 44, status PAL 43, cycle PAL 42, response PAL 41, retry PAL 40, DRAM controller chip 46, parity error logic and the memory control and status registers (MCSRs) 47.

The I/O address PAL 45 decodes all addresses on the physical address (PA) bus 23. The address can be memory address or an I/O address.

If the address is an implemented I/O address, the I/O address PAL 45 asserts KASPC (module 9 SPACE) to the response PAL 41, indicating that the address is implemented. The PAL 45 also selects or enables the referenced device which includes ROM 14, CDCR (Console Display/Control Register) PAL, Octal ART chip 26, MCSRs 47 (Memory Control and Status Registers) and TOY (time-of-year) clock 25. If the I/O reference is to an unimplemented I/O location (addresses 2008 5000 hex through 203F FFF hex), the address PAL 45 asserts NSSPC (Nonsupported Space) to the response PAL 41. The response PAL 41 then asserts RDY to the local bus 17 master, however, the data on DAL [31:0] is undefined.

The memory address comparator 44 decodes all addresses on the physical address (PA) bus 23. The comparator 44 inputs PA [29:28] and compares address bits DAL [27:0] with the starting address offset (SAO [7:0]) for local RAM 13. The starting address offset specifies the local RAM's 13 base address in system memory space.

If PA [29] is set, the reference is to I/O space, otherwise, the reference is to memory space. If PA [28] is set, the reference is above the upper limit, 0FFF FFFF hex, of the 256 Mbyte address range supported by the memory controller 12, and therefore cannot be implemented in the local RAM 13. If both PA [29] and PA [28] are clear, the comparator compares DAL [27:0] with SAO [7:0]. If DAL [27:0] is less than SAO [7:0], the referenced address is below the starting address offset, and therefore cannot be implemented in local RAM 13. If DAL [27:0] matches SAO [7:0], the referenced address is to on-board RAM 13. If DAL [27:0] is greater than SAO [7:0], the reference is not to on-board RAM 13 but may be to off-board RAM 15, that is, RAM on memory array boards 15.

The comparator outputs two signals, CPU NXM (CPU Nonexistent Memory) and LOW NXM (Low Nonexistent Memory) to the cycle 42 and response 41 PALs. When neither signal is asserted, the memory reference is to on-board RAM 13. In this case the cycle PAL 42 asserts RASIN (Row Address Strobe In) to the DRAM controller 46. The DRAM controller 46 then latches the PA address and outputs the address and control strobes for on-board RAM 13. When CPU NXM is asserted, the memory reference is not to on-board RAM 13, but may be to off-board RAM 15 (RAM on the memory array bus 21). In this case, the attached memory array boards 15 take over the address decoding. If the reference is to one of these memory array boards 15, the selected board will respond to the bus cycle. Otherwise, the BUS NXM (Bus Nonexistent Memory) is asserted to the response PAL 41, causing the PAL 41 to assert system REFERENCE to the chip 16 chip.

If the bus cycle was initiated by the processor chip 10, the chip 16 translates the transaction into a system transaction. If the bus cycle is an incoming system transaction, the chip 16 returns NO ACK on the system bus 18. When LOW NXM is asserted, the memory reference is not to local RAM 13. This causes the response PAL 41 to assert system REFERENCE to the chip 16. If the bus cycle was initiated by the processor chip 10, the chip 16 translates the transaction into a system transaction. If the bus cycle is an incoming system transaction, the response PAL 41 asserts ERR on the local bus 17 and the chip 16 returns NO ACK on the system bus.

The memory controller 12 provides status information to the local bus 17 master (processor 10 or chip 16) during a memory cycle. The bus master uses this status to control the cycle. The response logic for memory cycles is implemented in the status PAL 43 and the response PAL 41.

The status PAL 43 has an internal flip-flop called the Memory Locked bit. This flip-flop sets when an interlock read bus cycle locks the local memory 13. If another interlock read is attempted while the Memory Locked bit is set, the status PAL 43 asserts RETRY. The unlock write mask bus cycle clears the Memory Locked bit. Normally, the interlock read and unlock write mask bus cycles are a paired transaction and are generated by the same bus master.

The status PAL 43 also reports parity errors by asserting ERROR PENDING to the response PAL 41. If parity checking is enabled, the response PAL 41 then asserts ERR to the bus master to indicate abnormal termination of the bus cycle. ERROR PENDING remains asserted until cleared by a subsequent D-stream (data stream) read or write cycle.

If a bus cycle encounters no parity errors or is not restricted by a previous read lock, it may complete successfully. In this case the response PAL 41 asserts RDY to the bus master. If the processor chip 10 is the bus master, the response PAL 41 asserts RDY during the first response window in the cycle. This allows the processor 10 to execute a 400-ns (nominal) cycle. If the chip 16 is the bus master, the response PAL 41 asserts RDY when read data is valid on the local bus 17, which results in a long bus cycle of 500 ns (nominal). The chip 16 receives RDY early in the cycle for writes, which allows a minimum length bus cycle.

Table 7 (shown below) describes the sequence of responses of memory controller 12 to any given event in a memory cycle. Table 8 (shown below) describes the response.

TABLE 7

| | Response to Event During Cycle | | | |
|---|---|---|---|---|
| Bus Cycle Type | Successful Cycle | Memory Lock Set | Parity Error (during current cycle) | Error Pending Set from previous cycle) |
| locally-initiated Cycle | | | | |
| read I-stream | 1 | 1 | 1,2 | 1,4 |
| read D-stream | 1 | 1 | 2 | 9,3 |
| read lock | 1,6 | 5 | 1,2,7 | 9,7,3 |
| write | 1 | 1 | Not applicable | 9,10 |
| write unlock | 1 | 1,7 | Not applicable | 9,7,10 |
| system-initiated Cycle | | | | |
| read D-stream | 8 | 8 | 9 | 8,4 |
| read lock | 8,6 | 5 | 9 | 8,4,7 |
| write | 1 | 1 | Not applicable | 8,4 |
| write unlock | 8,7 | 8,7 | Not applicable | 1,4 |

TABLE 8

| Number | Response | Description |
|---|---|---|
| 1 | Early Ready | Assert RDY to the bus master during the first error sampling window in the bus cycle. This allows the processor 10 to execute a 400-ns bus cycle and the system interface 16 to execute a minimum length bus cycle of 400 ns (nominal). |
| 2 | Set Error Pending | Set the Error Pending flip-flop in the status PAL to indicate a parity error on the current bus cycle. |
| 3 | Clear Error Pending | Clear the Error Pending flip-flop. |
| 4 | Hold Error Pending | Keep the Error Pending flip-flop set. |
| 5 | Retry | Assert RETRY to the bus master. |
| 6 | Set Memory Lock | Set the Memory Locked bit in the status PAL. |
| 7 | Clear Memory Lock | Clear the Memory Locked bit. |
| 8 | Late Ready | Assert RDY to the system interface 16 when the memory cycle has completed, thus causing a long bus cycle of 500 ns (nominal). |
| 9 | Error | Assert ERR to the bus master to indicate abnormal termination of the bus cycle. |
| 10 | Complete Write | Allow the write cycle to complete. |

A DP8409 DRAM controller 46 drives the on-board RAM 13. The DRAM controller 46 generates the address, row and column address strobes, and refresh count for the 256 Kbyte DRAM chips.

The Column Address Strobe (CAS) from the DRAM controller 46 is divided into four CAS signals that are gated by BM [3:0]. When a Byte Mask line is asserted, the corresponding byte in the longword to be read or written.

Memory access and refresh cycles are controlled externally to the DRAM controller 46. The control logic is implemented in the cycle PAL 42 and the status PAL 43.

The status PAL 43 uses the synchronized Address Strobe (AS) and Refresh signals to arbitrate between memory and refresh cycles. When there is contention (both signals assert on the same clock edge), the memory cycle wins. If Synchronized Refresh alone is asserted, the PAL asserts the Refresh line to initiate a refresh cycle.

The status PAL 43 allows memory refreshing while a windowed local bus 17 transaction is outstanding on the system bus 18. While waiting for the transaction to complete, the processor 10 asserts AS to interlock the local bus 17. Normally, this would prevent a refresh cycle from occurring. However, the status PAL 43 can detect this situation, and will allow refreshing even though AS is asserted.

The cycle PAL 42 controls the address timing for both on-board 13 and off-board RAM 15. When on-board RAM 13 is referenced, the PAL 42 asserts RASIN (Row Address Strobe In) and CASIN (Column Address Strobe In) to the DRAM controller. The DRAM controller 46 synchronizes these signals internally and outputs RAS (Row Address Strobe) and CAS (Column Address Strobe) to the RAM. When the memory cycle is a possible reference to off-board RAM 15 (CPU NXM asserted and LOW NXM deasserted), the cycle PAL 42 asserts ARR RASIN (Array Row Address Strobe In) on the array bus. ARR RASIN serves as the start pulse for off-board memory and refresh cycles.

Under certain conditions, the retry PAL 40 suspends and then restarts (retries) local bus 17 transactions initiated by the processor 10. A detailed description of the retry sequence is given below.

Byte parity on the local bus 17 is generated for processor initiated transactions, by the processor transceivers 36, and for chip 16 initiated transactions, by the chip 16 transceivers. Parity is checked by the chip 16 transceivers 34. When the parity error signal is generated, the memory controller 12 generates two parity error reporting signals called PERR and PARITY ERROR.

Whenever a parity error is detected, PERR is asserted. This sets the Parity Error bit in the Memory Status Register 47 (MCSR0) when the cycle PAL 42 asserts DONE to indicate that the bus cycle has finished. The Parity Error bit is only a status bit. It does not cause the operating system to respond to the parity error.

PARITY ERROR is a logical AND of PERR and of the Parity Enable signal from the Memory Control Register 47 (MCSR1). If the Parity Enable signal is asserted, PARITY ERROR is asserted whenever PERR is asserted to the status PAL 43. The status PAL 43 then asserts Error Pending to the response PAL 44. The response PAL 41 terminates the bus cycle by asserting ERR to the bus master.

The memory controller 12 has four control and status registers. The memory status register reports parity errors and enables latching of the address at which a parity error occurs. The memory control register controls parity reporting and indicates whether local memory was successfully sustained by battery backup when main system power was off. The memory configuration register indicates the highest Mbyte boundary of the last memory array board 15 that was accessed. The memory starting address offset/error address register on power-up or reset is written to by the primary processor's memory configuration routine. The routine writes the starting address offset for local memory into this register. Under certain conditions, the register indicates the address of a memory location that was read with bad parity.

The memory array boards and associated buses are described in detail in application Ser. No. 07/093,580 "Memory Configuration System", filed on even date herewith and assigned to the same assignee as the present invention.

Figure 5:
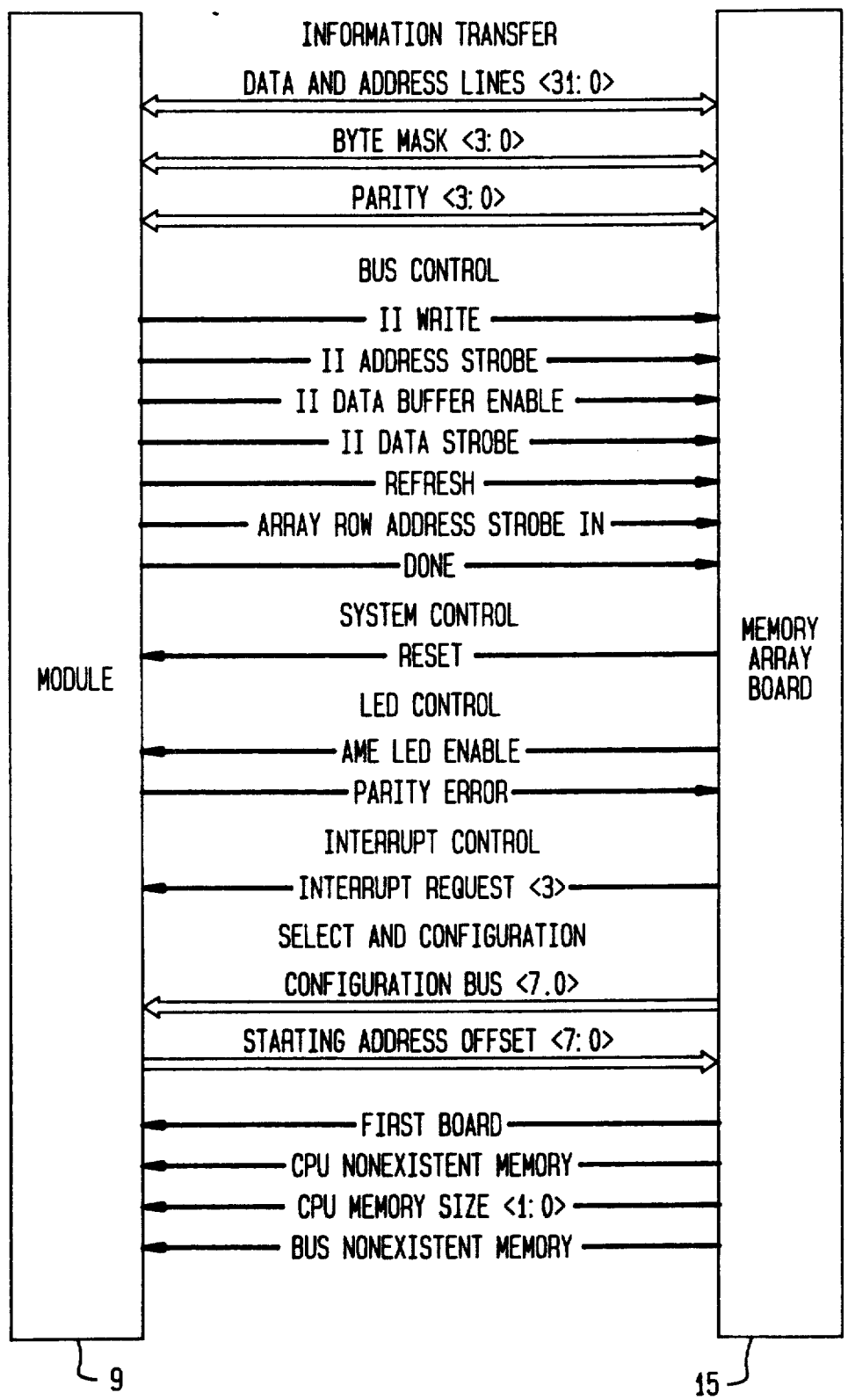
FIG. 5 is an illustration of the memory array bus structure of the memory system of FIG. 4.

As described in connection with FIGS. 4 and 5, additional memory may be connected to the memory array bus. However, in some instances, additional memory is not required but instead there is a need of an I/O bus, e.g. when a connection to an external processor 400 must be made. In accordance with the present invention, such I/O can be accommodated using the memory array bus, thereby eliminating the need for an additional I/O bus. In a single board processor this reduction in hardware is of great significance.

To accomplish this purpose, the configuration bus 407 is used for dual purposes. When used with memory, it provides unidirectional configuration information as described above. However, when used as an I/O bus, e.g., with an external processor 400, the bus becomes partially a bi-directional bus. The first four lines of the bus are taken off and provided into a bi-directional buffer 401. Inputs to this buffer are the signals CS0 and CS1 from the local bus 17. Outputs, which are obtained from the external processor 400 and provided into the buffer 401, are signals designated as STALL and RETRY. The RETRY signal is the same signal described above and provides an additional input into the RETRY PAL 40. The seventh bit of the configuration bus is utilized to indicate whether or not memory or an external processor is present on the end of the bus. If a memory is present, this bit is not asserted. If a processor is present the bit is asserted and this signal is provided as an input to buffer 401 to turn on the buffer and automatically convert what was a configuration bus into a bi-directional bus which permits operation as an I/O bus with an external processor.

Figure 6:
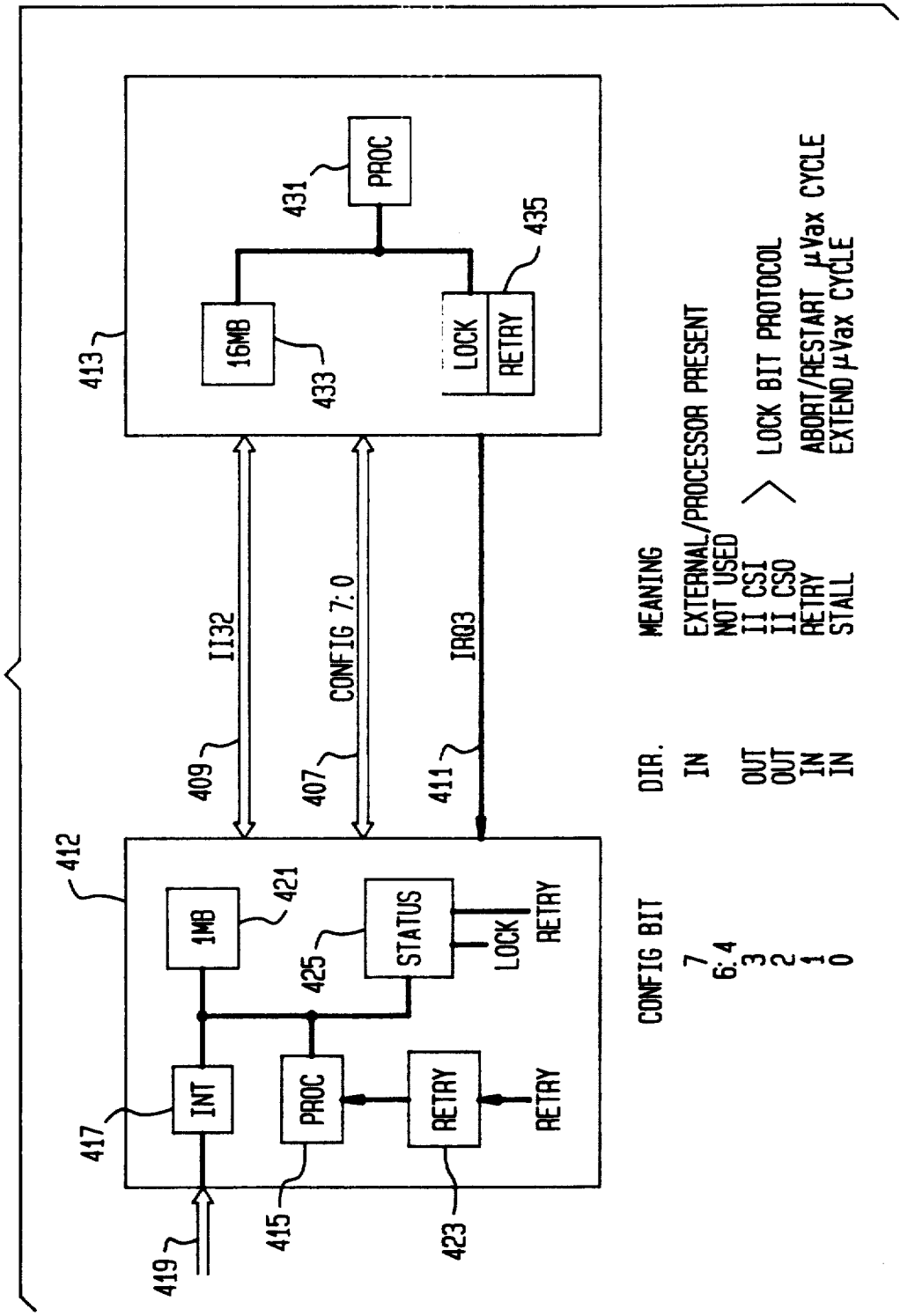
FIG. 6 is a block diagram illustrating the configuration of the bus of FIG. 5.

FIG. 6 is helpful in further understanding this type of operation. There are shown two computer systems, system 412 which includes the previously described processor 415, one megabyte of memory 421, interface 417 to interface with an external bus 419, status PAL 425 which controls the lock and retry logic and the retry PAL 423 itself. It of course includes all of the other hardware described above in connection with FIG. 4. Only this much of the apparatus is set out in block diagram form in order to give a better understanding of the reconfigured bus.

At the other side is a system 413 including one or more processors 431 with, for example, 16 megabytes of dynamic random access memory 433 and lock and retry logic 435. Shown with the figure is a definition of what the configuration bus bits mean when configured with an external processor present.

As shown, the seventh bit indicates that the external processor is present. Bits 4 to 6 are not used. Bits 2 and 3 are the internal bus signals CS1 and CS0 which control the lock bit protocol. (See FIG. 6) Finally, bit 1 is a RETRY signal and bit 0 is a STALL signal. Bits 2 and 3 are outputs from system 412 to system 413. The remaining bits 0, 1, and 7 are inputs from the system 413 to the system 412.

The computer system 413 can be a graphics system of the type described in copending application entitled High Performance Graphic Workstation, filed Aug. 13, 1987, and assigned to the same assignee as the present invention, the disclosure of which is hereby incorporated by reference. For a better understanding of the general use of STALL and RETRY, reference may be made to the aforementioned copending application Ser. No. 534,720.

As previously explained, RETRY can be asserted within the system 412 under a number of conditions. First of all RETRY may be asserted, the lock bit is set. The lock bit is set if the processor 415 is to be denied access to the memory 421. Such can be initiated by the memory itself or may be caused because the bus 419 is accessing the memory. RETRY can also be asserted by the interface device 16 if it has an incoming transaction at the same time there is a request for an outgoing transaction from processor 10. As previously explained, what occurs during RETRY is that the cycle then present and being carried out by the processor 415 is aborted and subsequently restarted. In addition, the arrangement of the present invention permits also asserting RETRY remotely from the system 413.

The processor 415 at times requires access to the memory 433 in the system 413. For example, when utilized in the aforementioned graphics system, the memory 433 will be storing data structures. Data structures are quite large and for proper operation it is necessary that a complete data structure be obtained all at one time from memory. Thus, if the processor 431 is accessing memory 433 to obtain a data structure it can interlock its memory 433 by setting a lock bit in the logic 435. If the processor 415 now attempts to access the memory 433, the presence of this lock bit causes a RETRY signal to be sent back over the configuration bus 407 to the system 412 where it will become an input to the RETRY PAL and cause aborting and restarting of the cycle of processor 415 in a manner more fully described below. RETRY may also be asserted as a result of the bus timeout specification of system 413, e.g. in order to refresh memory 433. Processor 415 can also lock out the remote memory through the use of the two CS0 and CS1 bits which are also provided on the configuration bus, e.g. when it is accessing the memory to obtain a data structure.

The STALL signal which is on bit 0 of the configuration bus in effect converts what is a synchronous bus when operated in the memory mode to an asynchronous bus when operated in the I/O mode. A normal memory cycle of the processor 413 operates in a synchronous manner. The processor expects to receive either a ready (RDY) or error (ERR) signal from response PAL 41 at a certain point in the cycle. Because of the fact that when operating with the system 413, it is operating with a system to which it is not synchronized, the bus cycle cannot always be completed at the proper time. What is done to avoid completion of the cycle is to assert the STALL signal on reconfigured bit 0. This may be done selectively or, as in the illustrated embodiment, each time the remote system is addressed. STALL is an input to the response PAL 41 of FIG. 4 and causes the response PAL 41 to delay providing the ERR or RDY output until STALL is no longer asserted. Thus, in response to the STALL signal the processor extends its cycle. When STALL is asserted the cycle is suspended. Once the STALL signal is deasserted, the cycle continues and the response PAL 41 can provide the RDY signal or ERR signal.

RETRY OPERATION

The need for some mechanism to resolve potential conflicts between the processor 10 and the requests on bus 18, as well cases where a memory, be it memory 13 or remote memory in a remote computer system 400, is clear in light of the foregoing overview of the system. The Retry method and apparatus which will now be described in detail provides that mechanism. It does so by operating various transceivers to electronically decouple processor 10 from the local bus 17, while at the same time storing the memory address which the processor 10 was using. During the time the processor 10 is decoupled, the potential conflict or deadlock is resolved by allowing the devices other than the processor 10 to perform their task. Upon resolution, Retry allows the processor 10 to resume operation by recoupling it to the local bus 17 and reasserting, from PAL 40, the proper addresses and signals. The method avoids the necessity of reinitializing processor 10 after such a break, which is required by some other systems, and also maximizes processor utilization.

In the illustrated embodiment three events can trigger the occurence of a Retry.

The first of these events is when an outgoing local bus 17 transaction contends with a system bus 18 transaction. Since bus interface chip 16 cannot translate transactions in both directions at once, the outgoing local bus transaction is suspended and then retried after the incoming system bus 18 transaction has been completed.

The second of these events is when the time-of-year (TOY) clock 25 is read from or written to. TOY clock 25 has both a slow setup time and a slow access time. The Retry sequence is thus well-suited for accessing this device.

The final event which may trigger the Retry sequence is when the processor 10 attempts an interlock read operation on memory, be it local memory 13 or memory in a remote processor coupled as described in connection with FIG. 6, when that memory is locked.

Although these three events trigger Retry in the illustrated embodiment, this should not be understood as a limitation upon the invention. Retry could be implemented with a plurality of other input/output devices or with other computer architectures.

The Retry sequence commences when bus interface chip 16, the status PAL or the remote computer asserts RETRY or when the I/O address PAL asserts TOY.

Figure 7:
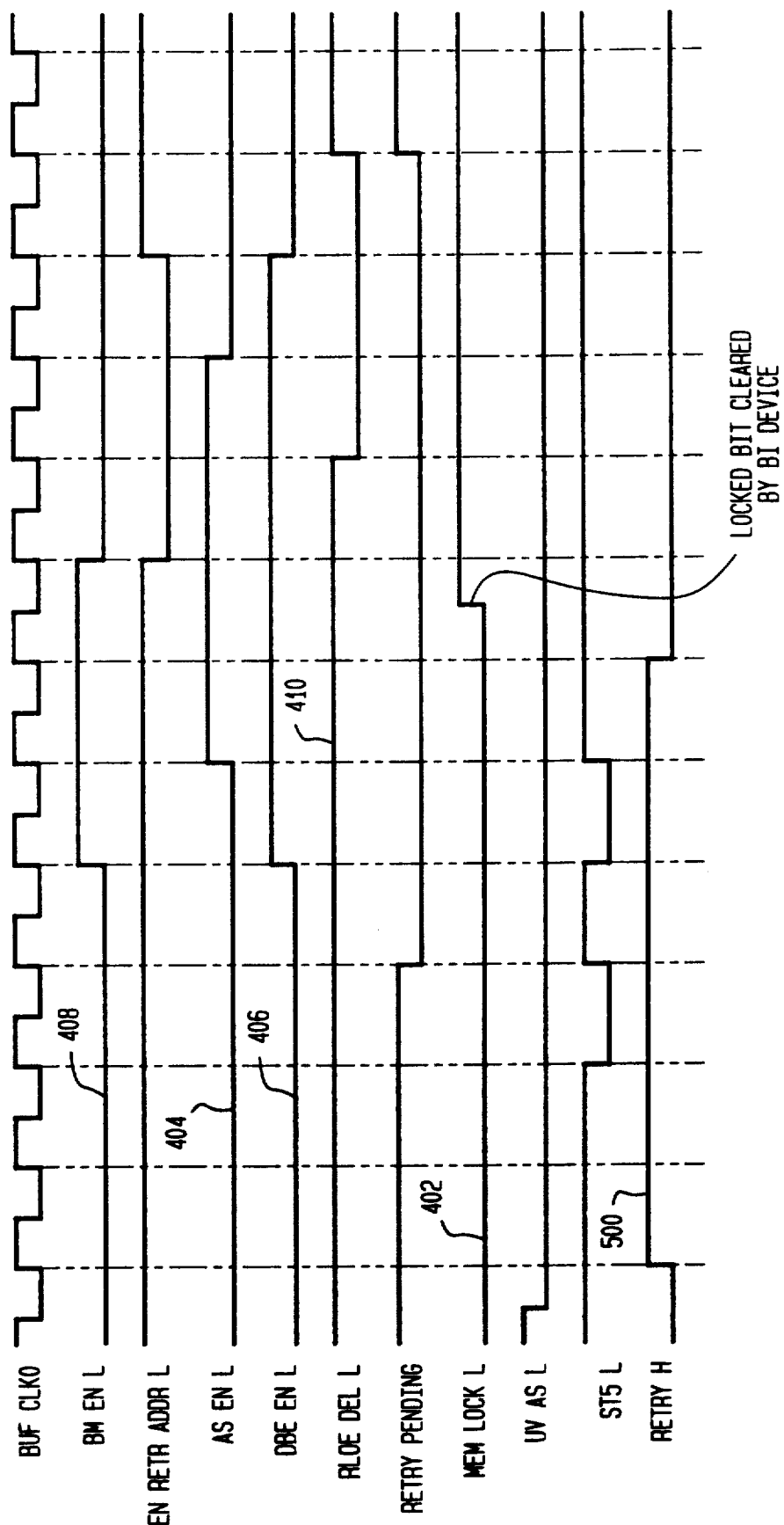

Referring now to FIG. 7, when RETRY 500 is asserted, due to LOCK 402 being low, retry PAL 40 deasserts the following control signals 1) AS EN (address Strobe Enable) 404, 2) DBE EN 406 (Data Buffer Enable) and 3) BMEN (Byte Mask Enable) 408. FIG. 7 is a timing diagram illustrating the sequence of these operations.

When the above signals are deasserted, the Byte mask signals become invalid, the address on DAL (29:2) lines is considered invalid, and the DAL transceivers 36 are disabled. In short, the transceivers and buffers that output the processor 10 bus control signals, DAL lines, and byte mask lines onto local bus 17 are all disabled. This removes all processor 10 signals from bus 17 and electronically isolates the processor 10 chip. At the same time that the previous signals are deasserted, the bus interface chip 16 stores the address output of processor 10 in its Retry address latch.

An internal flip-flop in retry PAL 40, called Retry Pending 419, is asserted (see FIG. 7A) to latch the address stored in bus interface chip 16 and to indicate to the retry PAL 40 that it must later restart the suspended local bus transaction. A retry pending input to Response PAL 41 prevents it from asserting RDY or ERR.

If the retry sequence was triggered in response to a signal from bus interface chip 16, in response to control signals asserted by processor 10, prior to asserting RETRY 500, bus interface chip 16 asserts DMR 420 (DMA Request), shown in FIG. 7A, to request that control of local bus 17 be given to the bus interface chip 16, as opposed to processor 10. In a normal operational sequence, processor 10 would assert UV DMG (processor DMA Grant) to the retry PAL 40 causing the retry PAL 40 to assert DMG (DMA Grant) to bus interface chip 16. However, in the Retry sequence, processor 10 is waiting for acknowledgment from the stalled local bus 17 transaction and cannot assert UV DMG. Retry PAL 40 senses that a retry is in progress, and takes over this function, and asserts DMG 422 to give the bus interface chip 16 bus control. The bus interface chip 16 deasserts RETRY and takes control of the local bus 17 issuing control signals 424 and completes the incoming system bus 18 transaction. Then, the bus interface chip 16 gives up control of the local bus 17 by deasserting DMR at 430, which causes the retry PAL 40 to deassert DMG at 432. Retry PAL 40 then restarts the stalled local bus 17 transaction with control signals at 434.

If the retry was in response to a TOY clock 25 reference, retry PAL 40 deasserts the DAL transaction control signals and asserts a TOY select. Retry PAL 40 then restarts the stalled local bus 17 transaction.

If the Retry was originally in response to a lock bit, the response PAL 41 also restarts the transaction when the lock bit is cleared and DMG is deasserted. This is shown in FIG. 7B. The interface 16, for example, asserts DMG at 450 and the processor asserts DMG at 451. At 453, the interface 16 asserts the control signals starting the bus (read) cycle, indicating that is a read lock. The lock bit is set in status PAL 43 by CS (1:0) at 455. When processor 10 asserts control signals and trys to read from memory at 457, Retry 500 is asserted by status PAL 43 causing Retry PAL 40 to deassert the control signals at 458 and set the retry pending bit at 459. Subsequently, when interface 16 does a write unlock, which completes at 461, the lock bit is cleared at 463, and Retry PAL 40 at 465 asserts the control signals that were deasserted at 458.

If the retry was initiated over the bus 407 from a remote device, the transaction is restarted when RETRY is no longer asserted.

Returning to FIG. 7, the local bus 17 transaction is restarted by the retry PAL 40 asserting Byte Mask Enable 408, which enables the processor 10 Byte Mask and Control Status lines. The retry PAL 40 then asserts RLOE (Retry latch Output Enable) to output the stored address from bus interface chip 16.

Next, RLOE Delay 412, a timing signal internal to retry PAL 40 is asserted, causing the Address Stobe Enable 404, and Data Buffer Enable 406 to assert at staggered intervals as shown in FIG. 7.

These enable signals gate processor 10 control signals to the local bus 17 at the proper intervals. The Retry sequence is completed when the response PAL 41 asserts either RDY or ERR to the processor 10 chip to indicate a successful or unsuccessful completion of the transaction.

By electronically isolating processor 10 from the local bus 17 during the privously described events, potential conflicts with other devices on the bus are avoided. Since the processor 10 is only suspended and the Retry PAL regenerates the beginning of the cycle, operation can resume without reinitializing the chip and with only a minimal loss of available processing capacity.

The logic equations for retry PAL 40 are as follows:

```
T:  PAL16R8
P:  23-175K5-00
N:  DENNIS HAYES      RETRY
D:  19-MAR-1987
S:  CLK RETRY IIDMR -UVDMG -ST5
    -RESET -TOY -UVAS -MEMLOCK GND
    GND -TOY_CYC -IIDMG -RET_PEND -RLOE_DEL
    -DBE_EN -AS_EN -RLOE -BM_EN VCC
B:  /-IIDMG= /-UVDMG *IIDMR *-RET_PEND *-TOY_
    CYC
         ;pass uVax dmg if dmr is asserted
      + IIDMR *-BM_EN */-RET_PEND
         ;generate dmg during retry
      + /-IIDMG *IIDMR */-RET_PEND
         ;hold dmg during retry
    /-RET_PEND= RETRY *-IIDMG *-RESET *-TOY_
    CYC */-UVAS */-ST5
         ;set ret_pend when st5 sets
      + /-RET_PEND *-DBE_EN
         ;hold ret_pend until dbe_en sets
      + /-RET_PEND *RETRY
         ;hold ret_pend until retry clears
      + /-UVAS */-IIDMG
    /-BM_EN= /-RET_PEND */RETRY *-IIDMG
    *-MEMLOCK
         ; issue bm_en after retry deasserts
      + -IIDMG *-RET_PEND
         ; normal set path
      + /-BM_EN *-RET_PEND *-TOY_CYC *-IIDMG
         ; normal hold path
      + /-RESET
    /-RLOE= /-RET_PEND */RETRY *-IIDMG *-AS_
    EN *-MEMLOCK
      + /-RLOE */-RET_PEND */RETRY *-TOY_CYC
        *-IIDMG *-AS_EN
      + /-TOY_CYC */RETRY *-IIDMG *-AS_EN
        *-DBE_EN
      + /-RLOE */-TOY_CYC */RETRY *-IIDMG
        *-AS_EN *-DBE_EN
    /-RLOE_DEL= /-RLOE */RETRY
      + /-UVAS */-TOY *-TOY_CYC */RETRY
        *-RET_PEND */-ST5 *-RESET
      + /-RLOE_DEL *-TOY_CYC *RET_PEND
        */-UVAS *-RLOE *-RESET
    /-AS_EN= /-RLOE_DEL */-RET_PEND
    */-RLOE *-IIDMG
         ; retry sequence set
      + /-AS_EN */RETRY */-RET_PEND *-TOY_
    CYC *-IIDMG
         ; retry hold path
      + -IIDMG *-TOY_CYC *-RET_PEND
        *-RLOE_DEL
         ; normal set path
      + /-RESET
         ; reset set path
      + /-TOY_CYC */-RLOE_DEL */-RLOE *-IIDMG
         ; toy cycle set
      + /-TOY_CYC */-AS_EN *-IIDMG */-DBE_EN
         ; toy cycle hold
      + /-RET_PEND */-DBE_EN
    /-DBE_EN= /-AS_EN */RETRY *-TOY *-TOY_CYC
    *-IIDMG
         ;set path no activity or retry in progress
      + /-DBE_EN *-RET_PEND *-TOY *-TOY_CYC
        *-IIDMG
         ;latch until event
      + -IIDMG *-TOY *-TOY_CYC *-RET_PEND
         ;deassert dbe_en before as_en
      + /-RESET
         ;reset set path
      + /-TOY_CYC */-AS_EN */-RLOE *-IIDMG
        */-RLOE_DEL
         ;assert after address is on bus
      + /-TOY_CYC */-DBE_EN */-AS_EN
        *-RLOE *-IIDMG
         ;hold until toy_cyc is over
    /-TOY_CYC= /_TOY *-RESET */-UVAS *-IIDMG
    *-AS_EN
      + /-TOY_CYC */-UVAS *-IIDMG
E:  END OF EQUATIONS
```

What is claimed is:

1. A method for resolving conflicts between a bus transaction initiated by a processor and another bus transaction initiated by a device on a bus in a computer system, the computer system comprising the processor, the device coupled to the bus, and a control logic device coupled to the processor, comprising the steps of:

(a) initiating a bus transaction by the processor by transmitting an address and a plurality of control signals from the processor to the bus so that the processor bus transaction is in progress;

(b) issuing a control signal by the device which causes the control logic device to suspend the processor bus transaction that is in progress when the other bus transaction initiated by the device is already in progress by:
  1) storing the address,
  2) deasserting the plurality of control signals,
  3) isolating the processor from the bus, and
  4) delaying issuance of a completion signal indicative of completion of the processor bus transaction, the processor being noncognizant of the suspension; and (c) subsequently restarting the processor bus transaction by the control logic device when the other bus transaction initiated by the device is completed by:
  1) reissuing the address and control signals,
  2) coupling the processor to the bus, and
  3) allowing completion of the processor bus transaction, the processor being noncognizant of the restart.

2. A method for resolving conflicts between a bus transaction initiated by a processor and other bus transactions on a bus in a computer system, the computer system comprising the processor, a control logic device coupled to the processor and a device coupled to the bus, comprising the steps of:

(a) initiating a bus transaction by the processor directed to the device by transmitting an address and a plurality of control signals from the processor to the bus so that the processor bus transaction is in progress;

(b) issuing a control signal by the device which causes the control logic device to suspend the processor bus transaction that is in progress when the device is in a locked state by:
  1) storing the address,
  2) deasserting the plurality of control signals,
  3) isolating the processor from the bus, and
  4) delaying issuance of a completion signal indicative of completion of the processor bus transaction, the processor being noncognizant of the suspension; and (c) subsequently restarting the processor bus transaction by the control logic device when the device is unlocked by:

1) reissuing the address and control signals,
2) coupling the processsor to the bus, and
3) allowing completion of the processor bus transaction, the processor being noncognizant of the restart.

3. Apparatus for resolving conflicts between a bus transaction initiated by a processor and other bus transactions on a bus, comprising:

the processor coupled to the bus, the processor including first means for initiating a bus transaction by transmitting an address and a plurality of control signals on the bus so that the processor bus transaction is in progress;

a device coupled to the bus, the device including second means for issuing a control signal when the device has started a bus transaction prior to a processor initiated bus transaction that is in progress;

a control logic device for suspending a processor bus transaction that is in progress, the processor being noncognizant that the processor bus transaction was suspended, in response to the control signal issued by the second means and for subsequently restarting the processor bus transaction, the processor being noncognizant that the processor bus transaction was restarted, when the other bus transaction is completed.

4. Apparatus for resolving conflicts between a bus transaction initiated by a processor and other bus transactions on a bus, comprising:

the processor coupled to the bus, the processor including first means to initiate a bus transaction by transmitting an address and a plurality of control signals on the bus so that the processor bus transaction is in progress;

a device coupled to the bus, the device including second means to issue a control signal when the device is in a locked state in response to a processor initiated bus transaction that is in progress directed to the locked device;

a control logic device for suspending a processor bus transaction, the processor being noncognizant that the processor bus transaction was suspended, in response to the control signal issued by the second means and for subsequently restarting the processor bus transaction, the processor being noncognizant that the processor bus transaction was restarted, when the locked device is unlocked.

5. Apparatus for resolving conflicts between a bus transaction initiated by a processor and other bus transactions on a bus, comprising:

monitoring means coupled to the bus, said monitoring means monitoring said bus for bus busy conditions and generating disable transceiver and enable transceiver signals in response to bus busy conditions; and transceiver means intercoupling said processor to said bus, transceiver means having control inputs coupled to said monitoring means for receiving said disable and enable transceiver signals, said transceiver means includes:

(i) first means for isolating said processor from said bus in response to said disable transceiver signals when said processor initiates a bus transaction by transmitting an address and a plurality of control signals on the bus so that the processor bus transaction is in progress, and (ii) second means for recoupling said processor to said bus in response to said enable transceiver signals.

6. The method according to claim 1 wherein said bus is coupled to a remote device and said processor is attempting to access said remote device and said bus transaction and wherein the suspension and restarting of aid bus transaction is done in response to a signal from said remote device.

7. The method according to claim 6 where said signal from said remote device is generated as a result of a bus timeout specification.

8. The method according to claim 6 wherein said signal from said remote device is generated as the result of the setting of a lock condition at said remote device.

9. Apparatus according to claim 3 and further including an interface device coupling said bus to a system bus.

10. Apparatus according to claim 9 wherein said control device comprises said interface device.

11. Apparatus according to claim 10 wherein said means for storing are included in said interface device.

12. Apparatus according to claim 9 and further including lock condition setting device and wherein said control device is adapted to respond to said lock condition setting device.

13. Apparatus according to claim 9 wherein the interface device couples said bus to an external device.

14. Apparatus according to claim 3 wherein said processor comprises a microprocessor.

15. Apparatus according to claim 5 wherein:
said monitoring means generates only said disable transceiver signals in response to a bus busy condition, and
said second means recouples said processor to said bus in response to the absence of said disable transceiver signals.

16. Apparatus according to claim 5 wherein:
said monitoring means generates only said enable transceiver signals, and
said first means isolates said processor from said bus in response to a bus busy condition.

* * * * *